(12) United States Patent
Watanabe

(10) Patent No.: US 12,384,020 B2
(45) Date of Patent: Aug. 12, 2025

(54) ENCODER DEVICE, DRIVE DEVICE, STAGE DEVICE, AND ROBOT DEVICE

(71) Applicant: NIKON CORPORATION, Tokyo (JP)

(72) Inventor: Akihiro Watanabe, Sendai (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/519,883

(22) Filed: Nov. 27, 2023

(65) Prior Publication Data

US 2024/0100689 A1 Mar. 28, 2024

Related U.S. Application Data

(63) Continuation of application No. 16/962,126, filed as application No. PCT/JP2019/000306 on Jan. 9, 2019, now Pat. No. 11,858,132.

(30) Foreign Application Priority Data

Jan. 15, 2018 (JP) ................. 2018-004239

(51) Int. Cl.
*B25J 9/04* (2006.01)
*B25J 19/02* (2006.01)
*G01D 5/245* (2006.01)

(52) U.S. Cl.
CPC ............... *B25J 9/04* (2013.01); *B25J 19/027* (2013.01); *G01D 5/245* (2013.01)

(58) Field of Classification Search
CPC .......... B25J 9/04; B25J 19/027; B25J 13/088; G01D 5/245; G01D 2205/40; G01D 5/145; G01D 5/24438; H02P 6/16

(Continued)

(56) References Cited

U.S. PATENT DOCUMENTS

| 11,623,340 B2 * | 4/2023 | Imai .................. B25J 9/123 |
| | | 74/490.03 |
| 2010/0213927 A1 | 8/2010 | Mehnert et al. |

(Continued)

FOREIGN PATENT DOCUMENTS

| JP | S55-076533 U | 5/1980 |
| JP | H08-136558 A | 5/1996 |

(Continued)

OTHER PUBLICATIONS

May 7, 2019 International Search Report issued in International Patent Application No. PCT/JP2019/000306.

(Continued)

*Primary Examiner* — Giovanni Astacio-Oquendo
(74) *Attorney, Agent, or Firm* — Oliff PLC

(57) ABSTRACT

An encoder device including a position detection unit for detecting position information of a moving part; a magnet having a plurality of polarities along a moving direction of the moving part; and an electric signal generation unit for generating an electric signal, based on a magnetic characteristic of a magnetosensitive part, the electric signal generation unit having the magnetosensitive part whose magnetic characteristic is changed by a change in magnetic field associated with relative movement to the magnet, wherein the magnetosensitive part is disposed so that the magnetosensitive part is spaced apart from a side surface of the magnet in a direction orthogonal to the moving direction and a length direction of the magnetosensitive part is orthogonal to tangential directions of at least some of magnetic field lines of the magnet.

19 Claims, 19 Drawing Sheets

(58) Field of Classification Search
USPC .................. 324/207.25, 207.26, 207.11, 200
See application file for complete search history.

(56) References Cited

U.S. PATENT DOCUMENTS

| | | |
|---|---|---|
| 2013/0015846 A1 | 1/2013 | Mehnert et al. |
| 2018/0113346 A1* | 4/2018 | Han .................. G06F 3/041661 |
| 2018/0340800 A1 | 11/2018 | Goto |
| 2020/0183563 A1* | 6/2020 | Weng .................. G06F 3/04166 |
| 2021/0034189 A1* | 2/2021 | Cheng .................. G06F 3/0416 |
| 2021/0109122 A1 | 4/2021 | Mitsuhashi |
| 2021/0200973 A1* | 7/2021 | Huang .................. G06F 3/0443 |
| 2022/0001540 A1* | 1/2022 | Gilchrist .................. B25J 5/007 |
| 2022/0161416 A1 | 5/2022 | Toyama |
| 2022/0179540 A1* | 6/2022 | Lee .................. G06V 40/1306 |
| 2023/0214057 A1* | 7/2023 | Lee ...................... G06F 3/0418 345/173 |
| 2024/0139967 A1* | 5/2024 | Lee .................. H01L 21/67259 |

FOREIGN PATENT DOCUMENTS

| | | |
|---|---|---|
| JP | 2000-161989 A | 6/2000 |
| JP | 2008-014799 A | 1/2008 |
| WO | 2016/010141 A1 | 1/2016 |
| WO | 2016/021074 A1 | 2/2016 |
| WO | 2017/126338 A1 | 7/2017 |

OTHER PUBLICATIONS

Jul. 21, 2020 International Preliminary Report on Patentability issued in International Patent Application No. PCT/JP2019/000306.
Jan. 6, 2022 Office Action issued in Chinese Patent Application No. 201980008453.X.
Jun. 22, 2022 Office Action issued in Chinese Patent Application No. 201980008453.X.
Jan. 28, 2023 Office Action issued in Chinese Patent Application No. 201980008453.X.
Aug. 22, 2023 Notice of Allowance issued in U.S. Appl. No. 16/962,126.

* cited by examiner

ENCODER DEVICE, DRIVE DEVICE, STAGE DEVICE, AND ROBOT DEVICE

This application is a continuation of application Ser. No. 16/962,126 filed Sep. 15, 2020, which is a National Stage of PCT/JP2019/000306 filed Jan. 9, 2019 and is based upon and claims the benefit of priority from Japanese Patent Application No. 2018-004239 filed on Jan. 15, 2018, the entire contents of the prior applications being incorporated herein by reference.

BACKGROUND

1. Technical Field

The present invention relates to an encoder device, a drive device, a stage device, and a robot device.

2. Related Art

An encoder device that detects position information of an object to be detected, such as a rotating angle, a rotating speed and the like is mounted to a variety of devices such as a robot device. As the encoder device of the related art, known is a device that converts a change in magnetic field of a rotating magnet into an electric signal by using a magnetic wire such as a Wiegand wire and obtains a rotating speed by using the electric signal (for example, see Patent Document 1).

For the encoder device in which the magnetic wire is used as described above, it is needed to generate a stable electric signal by reducing noises due to an unnecessary magnetic field of the magnet, thereby improving reliability of a detection result.

Patent Document 1: Japanese Unexamined Patent Application Publication No. H08-136558

GENERAL DISCLOSURE

According to a first aspect, there is provided an encoder device comprising a position detection unit for detecting position information of a moving part; a magnet having a plurality of polarities along a moving direction of the moving part; and an electric signal generation unit for generating an electric signal, based on a magnetic characteristic of a magnetosensitive part, the electric signal generation unit having the magnetosensitive part whose magnetic characteristic is changed by a change in magnetic field associated with relative movement to the magnet, wherein the magnetosensitive part is disposed so that the magnetosensitive part is spaced apart from a side surface of the magnet in a direction orthogonal to the moving direction and a length direction of the magnetosensitive part is orthogonal to tangential directions of at least some of magnetic field lines of the magnet.

According to a second aspect, there is provided a drive device comprising the encoder device according to the first aspect, and a power supplying unit for supplying power to the moving part. According to a third aspect, there is provided a stage device comprising a moving object, and the drive device according to the second aspect for moving the moving object. According to a fourth aspect, there is provided a robot device comprising the drive device according to the second aspect, and an arm for causing relative movement by the drive device.

DESCRIPTION OF EXEMPLARY EMBODIMENTS

First Embodiment

Figure 1:
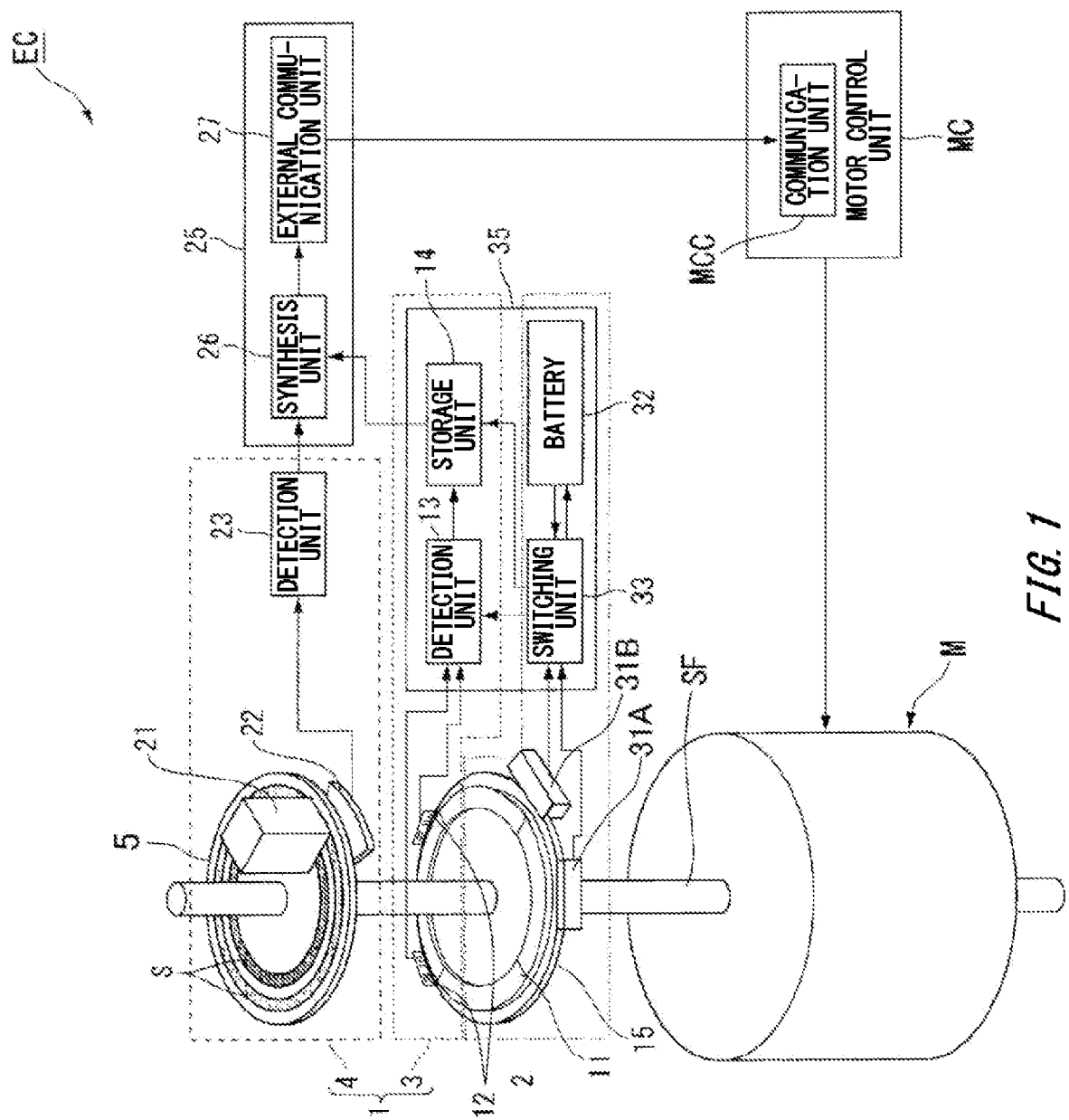
FIG. 1 shows an encoder device in accordance with a first embodiment.

A first embodiment is described with reference to FIGS. 1 to 5. FIG. 1 shows an encoder device EC in accordance with the present embodiment. In FIG. 1, the encoder device EC detects rotational position information of a rotary shaft SF (moving part) of a motor M (power supplying unit). The rotary shaft SF is, for example, a shaft (rotor) of the motor M, but may also be an operation shaft (output shaft) connected to the shaft of the motor M via a power transmission unit such as a transmission and also connected to a load. The rotational position information detected by the encoder device EC is supplied to a motor control unit MC. The motor control unit MC controls rotation (for example, a rotational position, a rotating speed and the like) of the motor M by using the rotational position information supplied from the encoder device EC. The motor control unit MC controls the rotation of the rotary shaft SF.

The encoder device EC comprises a position detection system (position detection unit) 1 and an electric power supplying system (electric power supplying unit) 2. The position detection system 1 detects the rotational position information of the rotary shaft SF. The encoder device EC is a so-called multi-turn absolute encoder, and detects the rotational position information including multi-turn information indicative of the number of rotations of the rotary shaft SF and angular position information indicative of an angular position (rotating angle) less than one-turn. The encoder device EC comprises a multi-turn information detection unit 3 that detects the multi-turn information of the rotary shaft SF, and an angle detection unit 4 that detects the angular position of the rotary shaft SF.

At least a part (for example, the angle detection unit 4) of the position detection system 1 operates by receiving electric power supply from a device (for example, a drive device, a stage device, a robot device) on which the encoder device EC is mounted, in a state where a power supply (for example, a main power supply) of the device is on, for example. Also, at least a part (for example, the multi-turn information detection unit 3) of the position detection system 1 operates by receiving electric power supply from the electric power supplying system 2, in a state (for example, an emergency state and a backup state) where a power supply (for example, a main power supply) of a device on which the encoder device EC is mounted is off. For example, in a state where the supply of electric power from a device on which the encoder device EC is mounted is cut off, the electric power supplying system 2 intermittently supplies electric power to at least a part (for example, the multi-turn information detection unit 3) of the position detection system 1, and the position detection system 1 detects at least a part (for example, the multi-turn information) of the rotational position information of the rotary shaft SF at the time when electric power is supplied from the electric power supplying system 2.

The multi-turn information detection unit 3 detects the multi-turn information by magnetism, for example. The multi-turn information detection unit 3 includes, for example, a magnet 11, magnetism detection units 12, a detection unit 13, and a storage unit 14. The magnet 11 is provided on a disc 15 fixed to the rotary shaft SF. Since the disc 15 rotates together with the rotary shaft SF, the magnet 11 rotates in conjunction with the rotary shaft SF. The magnet 11 is fixed to the outside of the rotary shaft SF, and mutual relative positions of the magnet 11 and the magnetism detection units 12 are changed due to the rotation of the rotary shaft SF. The strength and direction of a magnetic field on the magnetism detection unit 12 formed by the magnet 11 are changed by the rotation of the rotary shaft SF. The magnetism detection unit 12 detects a magnetic field that is formed by the magnet, and the detection unit 13 detects the position information of the rotary shaft SF, based on a detection result of the magnetism detection unit 12 detecting the magnetic field that is formed by the magnet 11. The storage unit 14 stores the position information detected by the detection unit 13.

The angle detection unit 4 is an optic or magnetic encoder, and detects position information (angular position information) within one-turn of a scale. For example, in a case of the optic encoder, the optic encoder detects the angular position within one-turn of the rotary shaft SF by reading patterning information of the scale with a light-receiving element, for example. The patterning information of the scale is, for example, bright and dark slits on the scale. The angle detection unit 4 detects the angular position information of the rotary shaft SF that is the same as a detection target of the multi-turn information detection unit 3. The angle detection unit 4 includes a light-emitting element 21, a scale S, a light-receiving sensor 22, and a detection unit 23.

The scale S is provided on a disc 5 fixed to the rotary shaft SF. The scale S includes an incremental scale and an absolute scale. The scale S may also be provided on the disc 15 or may be a member integrated with the disc 15. For example, the scale S may be provided on an opposite surface of the disc 15 to the magnet 11. The scale S may be provided on at least one of the inside and the outside of the magnet 11.

The light-emitting element 21 (an irradiation unit, a light-emitting unit) irradiates the scale S with light. The light-receiving sensor 22 (a light detection unit) detects light emitted from the light-emitting element 21 and passing through the scale S. In FIG. 1, the angle detection unit 4 is a transmission type, and the light-receiving sensor 22 detects light having passed through the scale S. Note that the angle detection unit 4 may also be a reflection type. The light-receiving sensor 22 supplies a signal indicative of a detection result to the detection unit 23. The detection unit 23 detects the angular position of the rotary shaft SF by using the detection result of the light-receiving sensor 22. For example, the detection unit 23 detects an angular position of a first resolution by using a detection result of light from the absolute scale. Also, the detection unit 23 detects an angular position of a second resolution higher than the first resolution by performing interpolation calculation on the angular position of the first resolution by using a detection result of light from the incremental scale.

In the present embodiment, the encoder device EC comprises a signal processing unit 25. The signal processing unit 25 calculates and processes a detection result of the position detection system 1. The signal processing unit 25 includes a synthesis unit 26 and an external communication unit 27. The synthesis unit 26 acquires the angular position information of the second resolution detected by the detection unit 23. Also, the synthesis unit 26 acquires the multi-turn information of the rotary shaft SF from the storage unit 14 of the multi-turn information detection unit 3. The synthesis unit 26 synthesizes the angular position information from the detection unit 23 and the multi-turn information from the multi-turn information detection unit 3, and calculates the rotational position information. For example, when the detection result of the detection unit 23 is $\theta(\text{rad})$ and the detection result of the multi-turn information detection unit 3 is n-turn, the synthesis unit 26 calculates $(2\pi \times n + \theta)(\text{rad})$, as the rotational position information. The rotational position information may also be information in which the multi-turn information and the angular position information less than one-turn are combined.

The synthesis unit 26 supplies the rotational position information to the external communication unit 27. The external communication unit 27 is communicatively connected to a communication unit MCC of the motor control unit MC in a wired or wireless manner. The external communication unit 27 supplies the rotational position information of a digital format to the communication unit MCC of the motor control unit MC. The motor control unit MC appropriately decodes the rotational position information from the external communication unit 27 of the angle detection unit 4. The motor control unit MC controls the rotation of the motor M by controlling electric power (drive electric power) supplied to the motor M by using the rotational position information.

The electric power supplying system 2 includes first and second electric signal generation units 31A and 31B, a battery 32, and a switching unit 33. The electric signal generation units 31A and 31B each generate an electric signal by the rotation of the rotary shaft SF. The electric signal includes a waveform where electric power (current, voltage) changes over time, for example. The electric signal generation units 31A and 31B each generate electric power as the electric signal by a magnetic field that changes based on the rotation of the rotary shaft SF, for example. For example, the electric signal generation units 31A and 31B generate electric power by a change in magnetic field that is formed by the magnet 11 that is used for the multi-turn information detection unit 3 to detect the multi-turn position of the rotary shaft SF. The electric signal generation units 31A and 31B are each disposed so that a relative angular position to the magnet 11 is changed by the rotation of the rotary shaft SF. The electric signal generation units 31A and 31B generate a pulsed electric signal when relative positions of the electric signal generation units 31A and 31B and the magnet 11 each reach predetermined positions, for example.

The battery 32 supplies at least a part of electric power that is consumed in the position detection system 1, based on the electric signals generated from the electric signal generation units 31A and 31B. The battery 32 includes, for example, a primary battery 36 such as a button-shaped battery and a dry-cell battery, and a rechargeable secondary battery 37 (see FIG. 4). The secondary battery of the battery 32 can be recharged by the electric signals (for example, current) generated from the electric signal generation units 31A and 31B, for example. The battery 32 is held in a holder 35. The holder 35 is, for example, a circuit substrate or the like on which at least a part of the position detection system 1 is provided. The holder 35 holds the detection unit 13, the switching unit 33, and the storage unit 14, for example. The holder 35 is provided with a plurality of battery cases capable of accommodating the battery 32, and an electrode, a wire and the like connected to the battery 32, for example.

The switching unit 33 switches whether to supply electric power from the battery 32 to the position detection system 1, based on the electric signals generated from the electric signal generation units 31A and 31B. For example, the switching unit 33 starts supply of electric power from the battery 32 to the position detection system 1 when levels of the electric signals generated from the electric signal generation units 31A and 31B become equal to or higher than a threshold value. For example, the switching unit 33 starts supplying electric power from the battery 32 to the position detection system 1 when electric power equal to or higher than the threshold value is generated from the electric signal generation units 31A and 31B. Also, the switching unit 33 stops supplying electric power from the battery 32 to the position detection system 1 when the levels of the electric signals generated from the electric signal generation units 31A and 31B become lower than the threshold value. For example, the switching unit 33 stops the supply of electric power from the battery 32 to the position detection system 1 when the electric power generated from the electric signal generation units 31A and 31B becomes lower than the threshold value. For example, in a case where a pulsed electric signal is generated in the electric signal generation units 31A and 31B, the switching unit 33 starts the supply of electric power from the battery 32 to the position detection system 1 at the time when a level (electric power) of the electric signal rises from a low level to a high level, and stops the supply of electric power from the battery 32 to the position detection system 1 after a predetermined time elapses since the level (electric power) of the electric signal changes to the low level. Also, the encoder device EC has a configuration of using the electric signals (pulse signals) generated from the electric signal generation units 31A and 31B, as a switching signal (trigger signal) for the supply of electric power from the battery 32 to the position detection system 1.

Figure 2A:
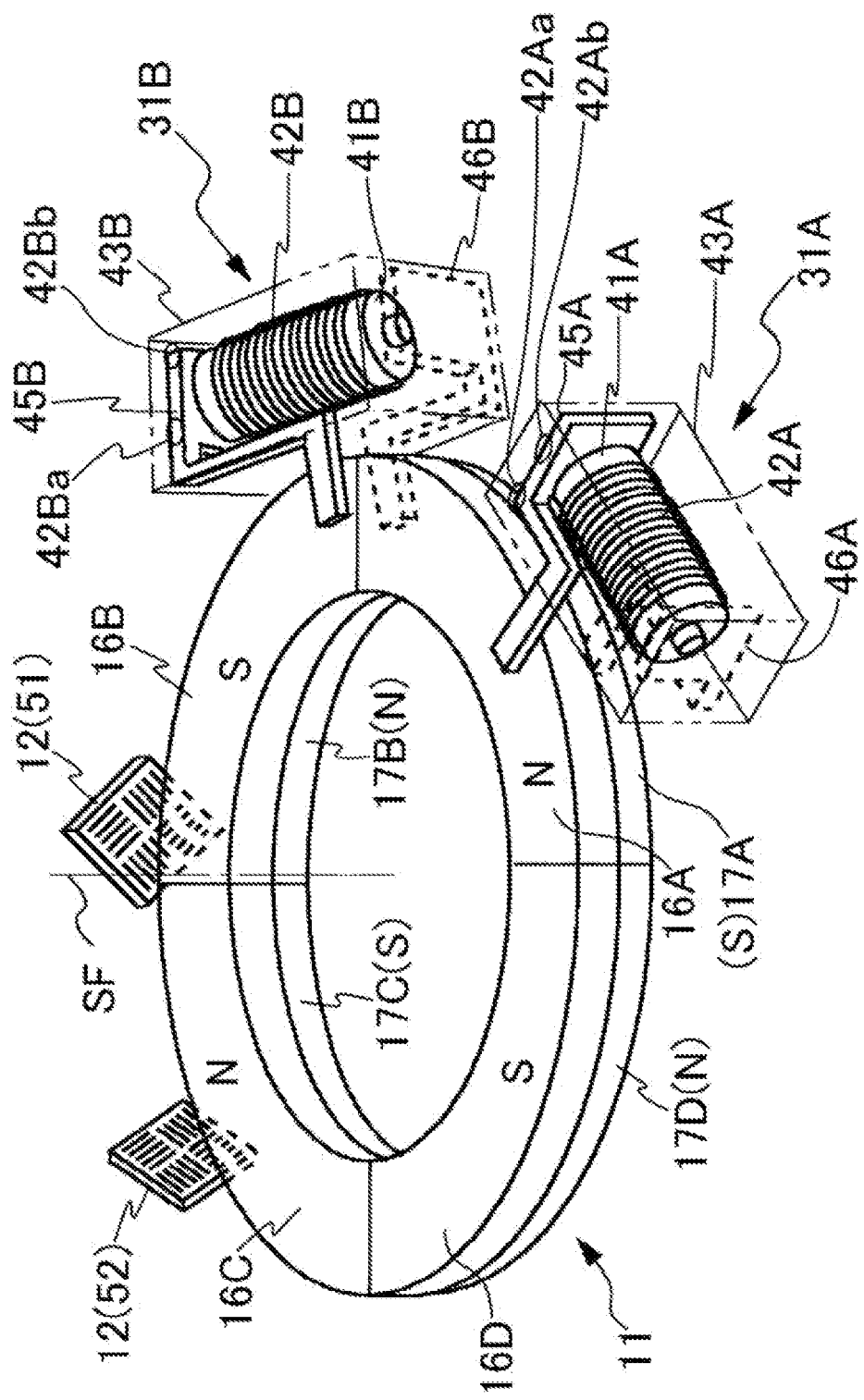
FIG. 2A is a perspective view showing a magnet, an electric signal generation unit, and a magnetic sensor in FIG. 1.
Figure 2B:
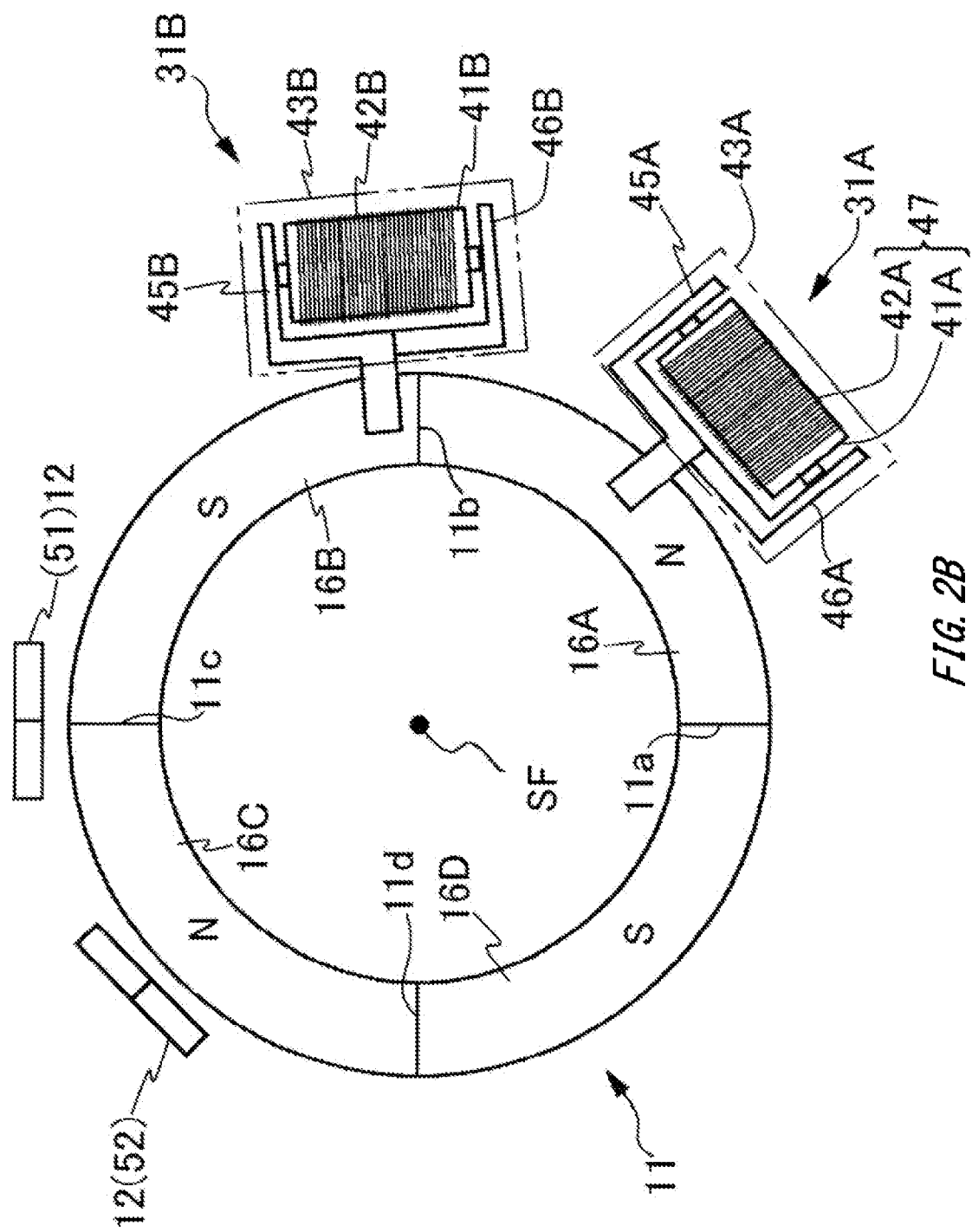
FIG. 2B is a plan view showing the magnet and the like in FIG. 2A.
Figure 2C:
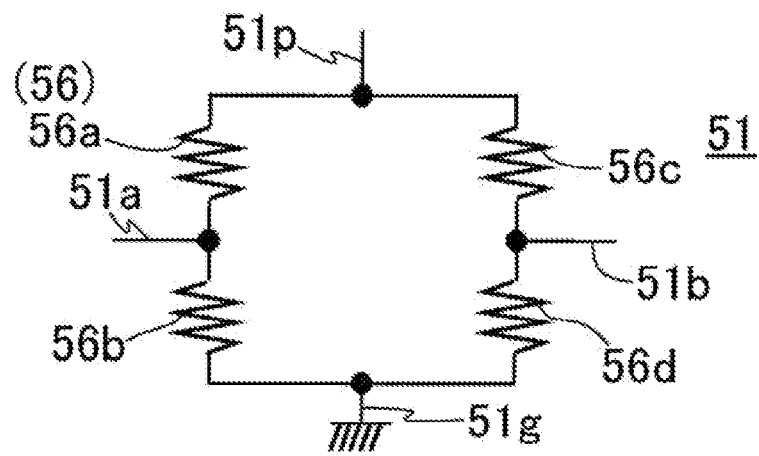
FIG. 2C is a circuit diagram showing the magnetic sensor in FIG. 2A.

FIG. 2A is a perspective view showing the magnet 11, the electric signal generation units 31A and 31B, and two magnetic sensors 51 and 52 that are the magnetism detection units 12 in FIG. 1, FIG. 2B is a plan view of the magnet 11 and the like in FIG. 2A, as seen from a direction parallel to the rotary shaft SF, and FIG. 2C is a circuit diagram of the magnetic sensor 51. Note that in FIG. 2A and the like, the rotary shaft SF of FIG. 1 is shown with a straight line. In FIGS. 2A and 2B, the magnet 11 is configured so that rotation changes the direction and strength of the magnetic field in an axial direction that is a direction parallel to a straight line (symmetrical first axis) passing through a center of the rotary shaft SF, the rotary shaft SF and thus the magnet 11 rotating around the first axis as a center. The magnet 11 is an annular member that is coaxial with the rotary shaft SF, for example. As an example, the magnet 11 is configured by a first annular magnet consisting of an N pole 16A, an S pole 16B, an N pole 16C, and an S pole 16D, which are sequentially disposed so as to surround the rotary shaft SF and each have an opening angle of 90° and a fan shape, and a second annular magnet consisting of an S pole 17A, an N pole 17B, an S pole 17C, and an N pole 17D, which have the same shapes as the N pole 16A to the S pole 16D and are each attached and disposed to one surface of the N pole 16A to the S pole 16D. The magnet 11 is a permanent magnet that is magnetized to have four pairs of polarities along a circumferential direction (or also referred to as a rotating direction) around the rotary shaft SF and generates a magnetic force. A front surface (a surface opposite to the motor M in FIG. 1) and a back surface (a surface on the same side as the motor M), which are main surfaces of the magnet 11, are each substantially perpendicular to the rotary shaft SF. In other words, in the magnet 11, the N pole 16A to the S pole 16D on the front surface-side and the S pole 17A to the N pole 17D on the back surface-side are offset by 90° in angle (for example, in positions of the respective N poles and the S poles) (180° in phase), and boundaries between the N poles and the S poles of the N pole 16A to the S pole 16D and boundaries between the S poles and the N poles of the S pole 17A to the N pole 17D substantially coincide with each other with respect to positions in the circumferential direction (angular positions). Note that the first annular magnet and the second annular magnet may be one magnet integrated continuously in the moving direction (for example, the circumferential direction, the rotating direction) or the axial direction and having a plurality of polarities or may be a hollow magnet having a space at the inside of these magnets.

Herein, for convenience of descriptions, rotation in a counterclockwise direction is referred to as forward rotation, and rotation in a clockwise direction is referred to as reverse rotation, as seen from a tip end side of the rotary shaft SF (an opposite side to the motor M in FIG. 1). Also, an angle of the forward rotation is indicated by a positive value, and an angle of the reverse rotation is indicated by a negative value. Note that rotation in a counterclockwise direction may be referred to as forward rotation, and rotation in a clockwise direction may be referred to as reverse rotation, as seen from a rear end side of the rotary shaft SF (the motor M-side in FIG. 1).

Herein, in a coordinate system fixed to the magnet 11, an angular position of a boundary between the S pole 16D and the N pole 16A in the circumferential direction is denoted as a position 11a, and angular positions (boundaries between the N pole and the S pole) sequentially rotated by 90° from the position 11a are each denoted as positions 11b, 11c and 11d. In a first section from the position 11a to the position 90° counterclockwise, the N pole is disposed on the front surface-side of the magnet 11, and the S pole is disposed on the back surface-side of the magnet 11. In the first section, a direction of the magnetic field of the magnet 11 in the axial direction is substantially parallel to an axial direction AD1 (see FIG. 3C) from the front surface-side toward the back surface-side of the magnet 11. In the first section, the strength of the magnetic field is maximized in the middle of the position 11a and the position 11b, and is minimized near the positions 11a and 11b.

In a second section of 90° in the counterclockwise direction from the position 11b (a section in which the S pole is disposed on the front surface-side of the magnet 11, and the N pole is disposed on the back surface-side of the magnet 11), a direction of the magnetic field of the magnet 11 in the axial direction is substantially a direction from the back surface-side toward the front surface-side of the magnet 11 (for example, an opposite direction to the axial direction AD1 (FIG. 3C)). In the second section, the strength of the magnetic field is maximized in the middle of the position 11b and the position 11c, and is minimized near the positions 11b and 11c. Similarly, in a third section from the position 11c to the position 90° counterclockwise and in a fourth section from the position 11d to the position 90° counterclockwise, directions of the magnetic fields of the magnet 11 in the axial direction are substantially a direction from the front surface-side toward the back surface-side of the magnet 11 and a direction from the back surface-side toward the front surface-side of the magnet 11, respectively.

As such, the directions of the magnetic field formed by the magnet 11 in the axial direction are sequentially reversed at the positions 11a to 11d. The magnet 11 forms an AC magnetic field in which the direction of the magnetic field in the axial direction is reversed with the rotation of the magnet 11, with respect to the coordinate system fixed to the outside of the magnet 11. The electric signal generation units 31A and 31B are disposed on the outer surface of the magnet 11 in a direction intersecting with a normal direction of the main surfaces of the magnet 11. In the present embodiment, the electric signal generation units 31A and 31B are provided without contacting the magnet 11 with each going away in a diametrical direction (for example, a radial direction) of the magnet 11 orthogonal to the rotary shaft SF or in a direction parallel to the diametrical direction. The first electric signal generation unit 31A includes a first magnetosensitive part 41A, a first electric power generation part 42A, and a first set of first magnetic body 45A and a first set of second magnetic body 46A. Note that one of the first magnetic body 45A and the second magnetic body 46A may be omitted. The first magnetosensitive part 41A, the first electric power generation part 42A, the first magnetic body 45A, and the second magnetic body 46A are fixed to the outside of the magnet 11, and relative positions thereof to each position on the magnet 11 are changed with the rotation of the magnet 11. For example, in FIG. 2B, the position 11b of the magnet 11 is disposed at a position 45° in the counterclockwise from the first electric signal generation unit 31A. When the magnet 11 rotates one-turn in the forward direction (counterclockwise) from this state, the positions 11a, 11d, 11c and 11b sequentially pass near the electric signal generation unit 31A.

The first magnetosensitive part 41A is a magnetosensitive wire such as a Wiegand wire. In the first magnetosensitive part 41A, large Barkhausen jump (Wiegand effect) is generated by the change in magnetic field associated with the rotation of the magnet 11. The first magnetosensitive part 41A is a cylindrical member whose projection image is rectangular, and an axial direction thereof is set in the circumferential direction of the magnet 11. Hereinafter, the axial direction of the first magnetosensitive part 41A, i.e., a direction perpendicular to a circular (or which may be polygonal or the like) cross-section of the first magnetosensitive part 41A is referred to as the length direction of the first magnetosensitive part 41A. Also, for example, a length of the magnetosensitive part in the direction (the axial direction, the length direction, the longitudinal direction) perpendicular to the cross-section of the magnetosensitive part (for example, the first magnetosensitive part 41A) is set to be longer than a length of the magnetosensitive part in a direction (width direction) parallel to the cross-section of the magnetosensitive part. When the AC magnetic field is applied in the axial direction (length direction) of the first magnetosensitive part 41A and the AC magnetic field is reversed, the first magnetosensitive part 41A generates a magnetic domain wall from one end toward the other end in the axial direction. As such, the length direction (axial direction) of the magnetosensitive part (for example, the first magnetosensitive part 41A and the like) of the present embodiment is also referred to as an easy magnetization direction that is a direction in which magnetization is easily oriented.

The first and second magnetic bodies 45A and 46A are formed of a ferromagnetic material such as iron, cobalt, nickel, for example. The first and second magnetic bodies 45A and 46A can also be referred to as yokes. The first magnetic body 45A is provided between the front surface of the magnet 11 and one end of the first magnetosensitive part 41A, and the second magnetic body 46A is provided between the back surface of the magnet 11 and the other end of the first magnetosensitive part 41A. Tip end portions of the first and second magnetic bodies 45A and 46A are disposed at the same angular position in the circumferential direction on the front surface and back surface of the magnet 11. The polarities of the magnet 11 are always opposite to each other at the tip end portions of the first and second magnetic bodies 45A and 46A, and when the tip end portion of the first magnetic body 45A is positioned near the N pole 16A (or the S pole 16B), the tip end portion of the second magnetic body 46A is located near the S pole 17A (or the N pole 17B). For this reason, the first and second magnetic bodies 45A and 46A guide magnetic field lines from the two parts of the magnet 11 (for example, the N pole 16A and the S pole 17A), which are located at the same position in the circumferential direction of the magnet 11 and have polarities different from each other, to the length direction of the first magnetosensitive part 41A. By the magnet 11, the first magnetic body 45A, the first magnetosensitive part 41A, and the second magnetic body 46A, a magnetic circuit MC1 (see FIG. 3A) including the magnetic field lines toward the length direction of the first magnetosensitive part 41A is formed. Note that a peripheral edge portion of the disc 15 of FIG. 1 is provided with a step (not shown), so that a space into which the second magnetic body 46A can be inserted is secured between the peripheral edge portion of the disc 15 and the back surface the magnet 11.

The first electric power generation part 42A is, for example, a high-density coil wound and disposed on the first magnetosensitive part 41A. In the first electric power generation part 42A, electromagnetic induction is generated due to the generation of the magnetic domain wall in the first magnetosensitive part 41A, so that an induction current flows. When the positions 11a to 11d of the magnet 11 shown in FIG. 2B pass near the electric signal generation unit 31A (the tip end portions of the magnetic bodies 45A and 46A), a pulsed current (electric signal, electric power) is generated in the first electric power generation part 42A.

A direction of the current generated in the first electric power generation part 42A is changed in accordance with the direction of the magnetic field before and after the reversal. For example, a direction of the current that is generated upon the reversal from the magnetic field toward the front surface-side to the magnetic field toward the back surface-side of the magnet 11 is opposite to a direction of the current that is generated upon the reversal from the magnetic field toward the back surface-side to the magnetic field toward the front surface-side of the magnet 11. The electric power (induction current) that is generated in the first electric power generation part 42A can be set by the number of turns in the high-density coil, for example.

As shown in FIG. 2A, the first magnetosensitive part 41A, the first electric power generation part 42A, and the parts of the first and second magnetic bodies 45A and 46A on the first magnetosensitive part 41A-side are accommodated in a case 43A. The case 43A is provided with terminals 42Aa and 42Ab. The high-density coil of the first electric power generation part 42A has one end and the other end thereof that are electrically connected to the terminals 42Aa and 42Ab, respectively. The electric power generated in the first electric power generation part 42A can be extracted outside of the first electric signal generation unit 31A via the terminals 42Aa and 42Ab.

The second electric signal generation unit 31B is disposed in an angular position forming an angle larger than 0° and smaller than 180° from the angular position in which the first electric signal generation unit 31A is disposed. An angle between the electric signal generation units 31A and 31B is selected within a range from 22.5° to 67.5°, for example, and is about 45° in FIG. 2B. The second electric signal generation unit 31B has a similar configuration to the first electric signal generation unit 31A. The second electric signal generation unit 31B includes a second magnetosensitive part 41B, a second electric power generation part 42B, and a second set of first magnetic body 45B and a second set of second magnetic body 46B. The second magnetosensitive part 41B, the second electric power generation part 42B, and the second set of first and second magnetic bodies 45B and 46B are similar to the first magnetosensitive part 41A, the first electric power generation part 42A, and the first set of first and second magnetic bodies 45A and 46A, respectively, and the descriptions thereof are thus omitted. The second magnetosensitive part 41B, the second electric power generation part 42B, and the parts of the first and second magnetic bodies 45B and 46B on the second magnetosensitive part 41B-side are accommodated in a case 43B. The case 43B is provided with terminals 42Ba and 42Bb. The electric power generated in the second electric power generation part 42B can be extracted outside of the second electric signal generation unit 31B via the terminals 42Ba and 42Bb. Note that at least a part of the magnetosensitive part (for example, the first magnetosensitive part 41A and the second magnetosensitive part 41B) is disposed spaced apart outside of the magnet 11 in the diametrical direction of the magnet 11 or in the parallel direction thereof. For example, when the surfaces (i.e., the surfaces on which the plurality of polarities of the magnet is aligned) of the magnet 11 orthogonal to the rotary shaft SF are each referred to as one surface and the other surface, the magnetosensitive part is disposed spaced apart outside with respect to a side surface (or a side surface parallel to the axial direction of the rotary shaft SF) of the magnet 11 orthogonal to one surface or the other surface of the magnet 11 and along the moving direction of the magnet.

The magnetism detection unit 12 includes magnetic sensors 51 and 52. The magnetic sensor 51 is disposed in an angular position greater than 0° and smaller than 180° with respect to the second magnetosensitive part 41B (second electric signal generation unit 31B) in the rotating direction of the rotary shaft SF. The magnetic sensor 52 is disposed in an angular position (about 45°, in FIG. 2B) greater than 22.5° and smaller than 67.5° with respect to the magnetic sensor 51 in the rotating direction of the rotary shaft SF.

As shown in FIG. 2C, the magnetic sensor 51 includes a magnetoresistive element 56, a bias magnet (not shown) for applying a magnetic field having predetermined strength to the magnetoresistive element 56, and a waveform shaping circuit (not shown) for shaping a waveform from the magnetoresistive element 56. The magnetoresistive element 56 has a full bridge shape where elements 56a, 56b, 56c and 56d are connected in series. A signal line between the elements 56a and 56c is connected to a power supply terminal 51p, and a signal line between the elements 56b and 56d is connected to a ground terminal 51g. A signal line between the elements 56a and 56b is connected to a first output terminal 51a, and a signal line between the elements 56c and 56d is connected to a second output terminal 51b. The magnetic sensor 52 has a similar configuration to the magnetic sensor 51, and the descriptions thereof are thus omitted.

Subsequently, operations of the first electric signal generation unit 31A of the present embodiment are described. Hereinafter, the first magnetosensitive part 41A and the first electric power generation part 42A of the first electric signal generation unit 31A shown in FIG. 2B are collectively described as a magnetosensitive member 47. A length direction of the magnetosensitive member 47 is the same as the length direction of the first magnetosensitive part 41A, and the center in the length direction of the magnetosensitive member 47 is the same as the center in the length direction of the first magnetosensitive part 41A. Note that since operations of the second electric signal generation unit 31B are similar to those of the first electric signal generation unit 31A, the descriptions thereof are omitted.

Figure 3A:
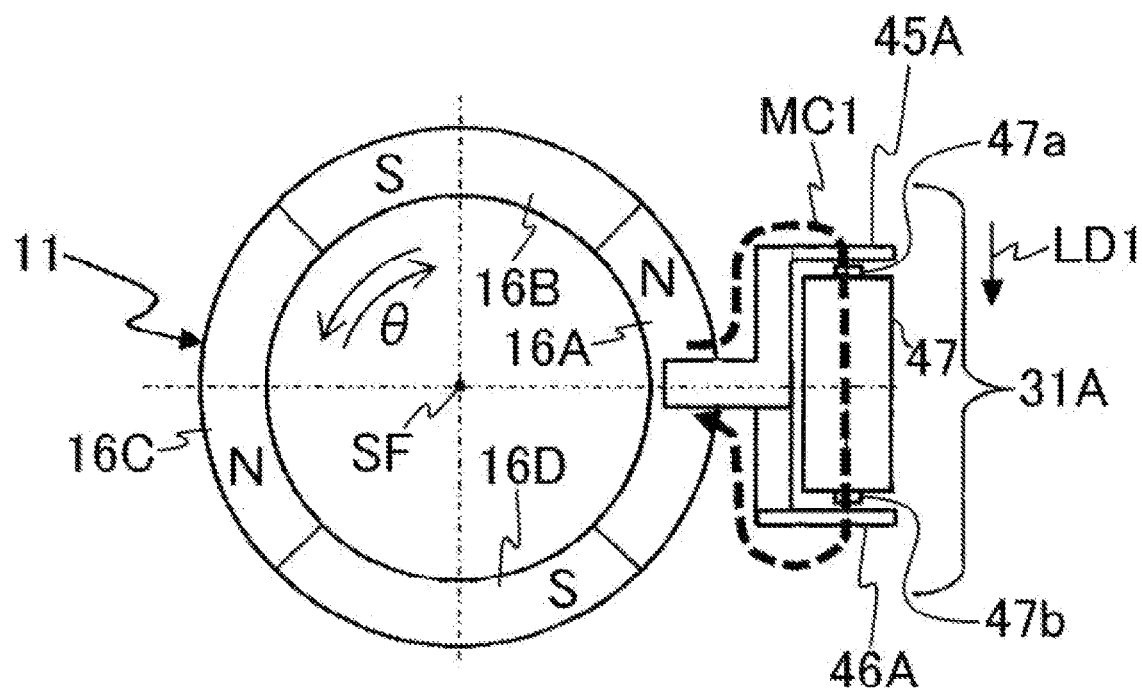
FIG. 3A is a plan view showing the magnet and the electric signal generation unit in FIG. 2A.
Figure 3B:
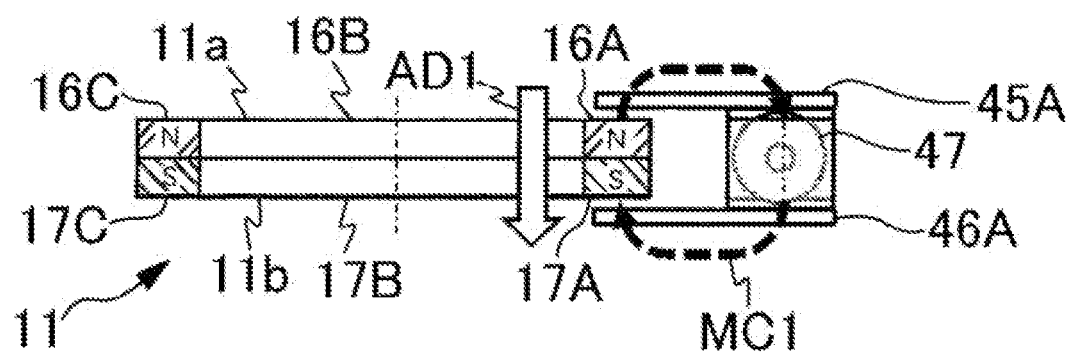
FIG. 3B is a sectional view of FIG. 3A.
Figure 3C:
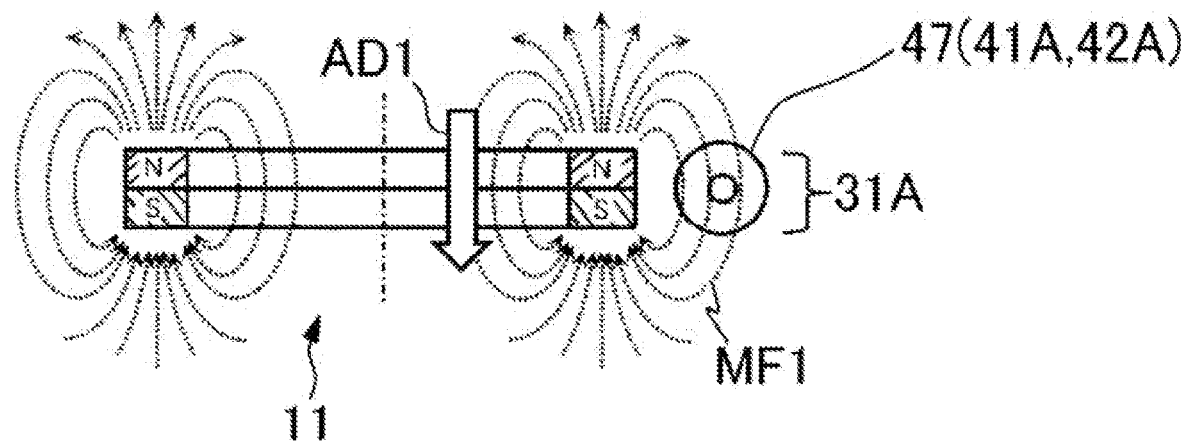
FIG. 3C is a sectional view of FIG. 3A.
Figure 3D:
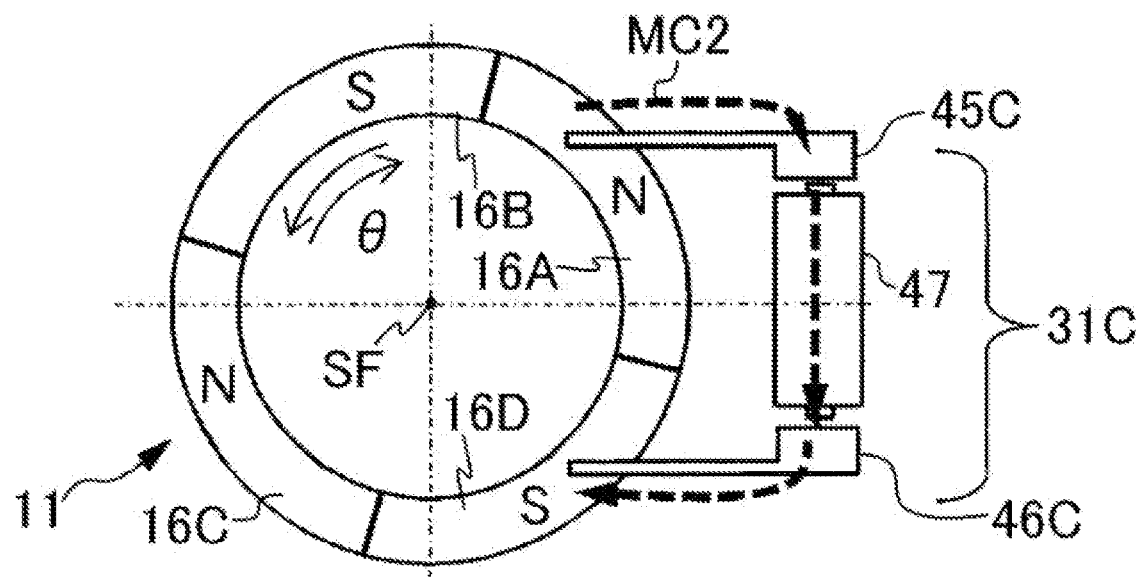
FIG. 3D is a plan view showing a modified embodiment.
Figure 3E:
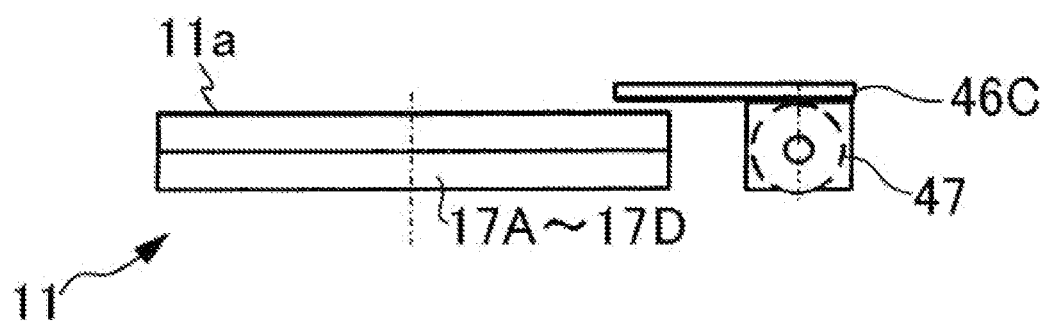
FIG. 3E is a side view of FIG. 3D.

FIG. 3A is a plan view depicting the magnet 11 and the electric signal generation unit 31A shown in FIG. 2A, and FIGS. 3B and 3C are sectional views of the magnet 11 shown in FIG. 3A. In FIGS. 3A and 3B, the magnet 11 has a flat plate shape along a rotating direction (hereinafter, also referred to as the θ direction) around the rotary shaft SF, has a plurality of polarities (the N pole 16A to the S pole 16D) different from each other in the θ direction, and has two polarities (the N pole 16A and the S pole 17A, and the like) different from each other in a thickness direction (in the present embodiment, the axial direction AD1 of the rotary shaft SF) orthogonal to the θ direction. For this reason, the axial direction AD1 can also be referred to as an orientation direction (magnetization direction) of parts of the magnet 11 having polarities different from each other (the N pole 16A, the S pole 17A, and the like). As the magnet 11 rotates in the θ direction, the direction and strength of the magnetic field in the axial direction or the orientation direction AD1 are changed.

Also, the magnetosensitive member 47 (or the magnetosensitive part) is disposed near the outer surface of the magnet 11 so that the length direction thereof is parallel to the front surface (one surface or back surface) of the magnet 11 having a flat plate shape. In FIG. 3A, when the length direction of the magnetosensitive member 47 is referred to as a direction LD1, the length direction LD1 is parallel to the front surface of the magnet 11. In the present embodiment, the length direction LD1 of the magnetosensitive member 47 is substantially parallel to the θ direction (circumferential direction), and is also substantially orthogonal to the axial direction AD1 that is the magnetization direction of the magnet 11 (for example, a specific direction in which a direction of a magnetic pole is fixed). Also, as shown in FIG. 3C, the length direction of the magnetosensitive member 47 is disposed so as to be substantially orthogonal to a tangential direction (herein, a direction parallel to the axial direction AD1) of a magnetic field line MF1, which passes through a substantial center (for example, a position of a half of a length in the length direction of the magnetosensitive member 47 or the magnetosensitive part (41A, 41B)) in the length direction of the magnetosensitive member 47, of the magnetic field lines of the magnet 11. Note that the length direction LD1 of the magnetosensitive member 47 is disposed so as to be substantially orthogonal to the thickness direction orthogonal to the θ direction. Also, the first and second magnetic bodies 45A and 46A guide magnetic field lines from the two parts of the magnet 11 (for example, the N pole 16A and the S pole 17A), which are located at the same angular position in the θ direction and have polarities different from each other, to the length direction LD1 of the magnetosensitive member 47 via one end 47a and the other end 47b of the magnetosensitive member 47.

A magnetic field component unnecessary for pulse generation in the electric signal generation unit 31A including magnetic field lines generated on a side surface of the magnet 11 is orthogonal to the length direction of the magnetosensitive member 47, and the unnecessary magnetic field component does not adversely affect the generation of the magnetic domain wall from one end toward the other end of the magnetosensitive member 47 due to large Barkhausen jump (Wiegand effect) in the length direction of the magnetosensitive member 47 caused by the reversal of the AC magnetic field due to the rotation of the magnet 11. For this reason, even when the magnetosensitive member 47 is disposed near the magnet 11 and the electric signal generation unit 31A is thus downsized, it is possible to effectively generate the stable high-output pulse by using the electric signal generation unit 31A through the reversal of the AC magnetic field in the axial direction due to the rotation of the magnet 11, without being affected by the unnecessary magnetic field component.

Figure 4:
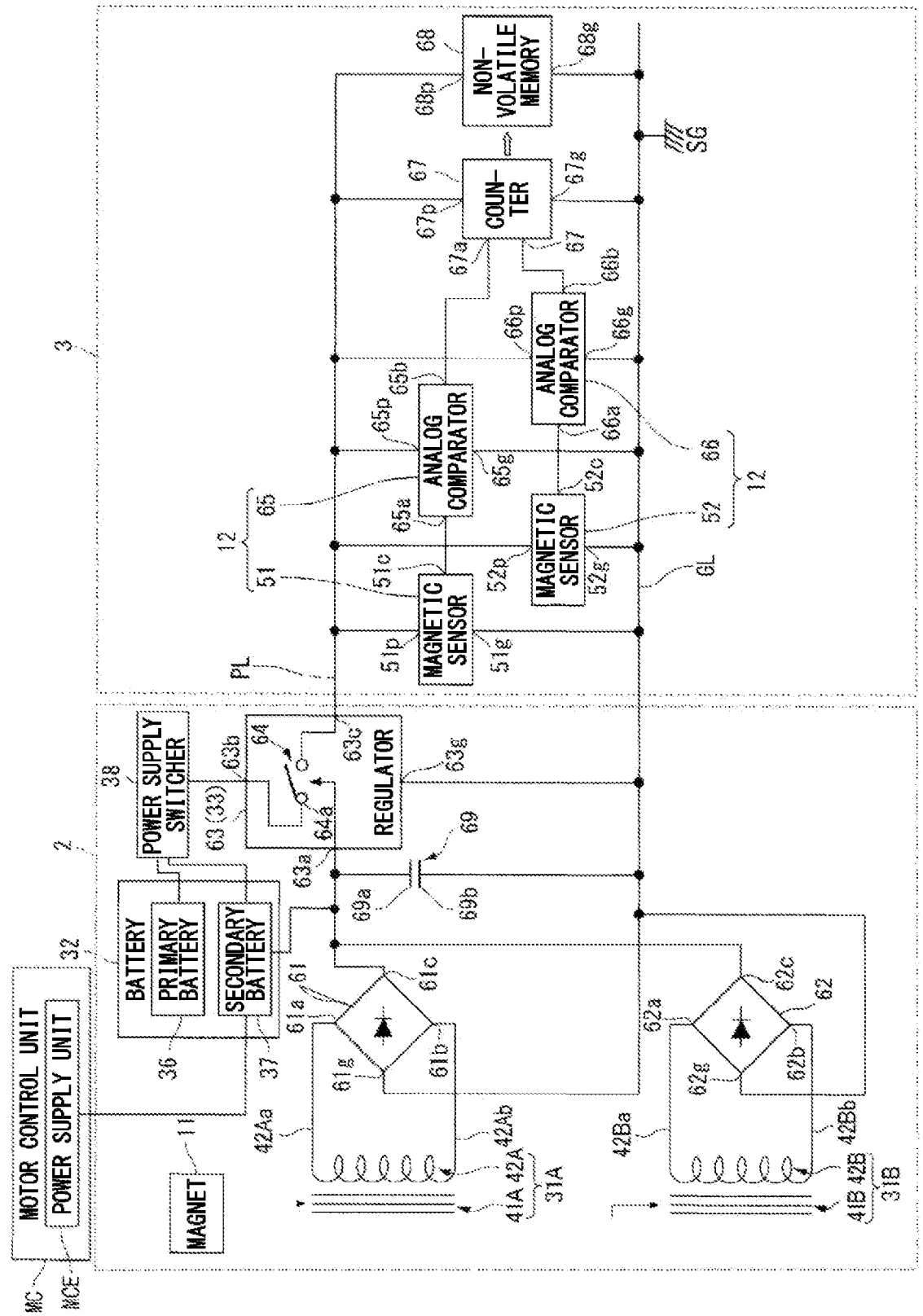
FIG. 4 shows a configuration of an electric power supplying system and a multi-turn information detection unit of the encoder device shown in FIG. 1.

FIG. 4 shows a circuit configuration of the electric power supplying system 2 and the multi-turn information detection unit 3 in accordance with the present embodiment. In FIG. 4, the electric power supplying system 2 includes the first electric signal generation unit 31A, a rectifier stack 61, the second electric signal generation unit 31B, a rectifier stack 62, and the battery 32. Also, the electric power supplying system 2 includes a regulator 63, as the switching unit 33 shown in FIG. 1. The rectifier stack 61 is a rectifier that rectifies a current flowing from the first electric signal generation unit 31A. A first input terminal 61a of the rectifier stack 61 is connected to the terminal 42Aa of the first electric signal generation unit 31A. A second input terminal 61b of the rectifier stack 61 is connected to the terminal 42Ab of the first electric signal generation unit 31A. A ground terminal 61g of the rectifier stack 61 is connected to a ground line GL to which the same potential as a signal ground SG is supplied. During the operation of the multi-turn information detection unit 3, the potential of the ground line GL becomes a reference potential of the circuit. An output terminal 61c of the rectifier stack 61 is connected to a control terminal 63a of the regulator 63.

The rectifier stack 62 is a rectifier that rectifies a current flowing from the second electric signal generation unit 31B. A first input terminal 62a of the rectifier stack 62 is connected to the terminal 42Ba of the second electric signal generation unit 31B. A second input terminal 62b of the rectifier stack 62 is connected to the terminal 42Bb of the second electric signal generation unit 31B. A ground terminal 62g of the rectifier stack 62 is connected to the ground line GL. An output terminal 62c of the rectifier stack 62 is connected to the control terminal 63a of the regulator 63.

The regulator 63 regulates electric power that is supplied from the battery 32 to the position detection system 1. The regulator 63 may include a switch 64 provided on an electric power supply path between the battery 32 and the position detection system 1. The regulator 63 controls an operation of the switch 64, based on the electric signals generated from the electric signal generation units 31A and 31B. An input terminal 63b of the regulator 63 is connected to the battery 32. An output terminal 63c of the regulator 63 is connected a power supply line PL. A ground terminal 63g of the regulator 63 is connected to the ground line GL. The control terminal 63a of the regulator 63 is an enable terminal, and the regulator 63 keeps a potential of the output terminal 63c to a predetermined voltage in a state where a voltage equal to or higher than a threshold value is applied to the control terminal 63a. An output voltage (predetermined voltage) of the regulator 63 is, for example, 3V when a counter 67 is configured by a CMOS and the like. An operating voltage of a non-volatile memory 68 of the storage unit 14 is set to the same voltage as the predetermined voltage, for example. Note that the predetermined voltage is a voltage necessary for electric power supply, and may be not only a constant voltage value, but also a voltage changing in a stepwise manner.

A first terminal 64a of the switch 64 is connected to the input terminal 63b, and a second terminal 64b is connected to the output terminal 63c. The regulator 63 switches conduction and insulation states between the first terminal 64a and the second terminal 64b of the switch 64 by using the electric signals supplied from the electric signal generation units 31A and 31B to the control terminal 63a, as a control signal (enable signal). For example, the switch 64 includes a switching device such as a MOS, a TFT and the like, the first terminal 64a and the second terminal 64b are a source electrode and a drain electrode, and a gate electrode is connected to the control terminal 63a. The switch 64 is in a state (on state) where the source electrode and the drain electrode can be conductive therebetween, when the gate electrode is charged by the electric signals (electric power) generated from the electric signal generation units 31A and 31B and a potential of the gate electrode becomes equal to or higher than a threshold value. Note that the switch 64 may also be provided outside the regulator 63, and may be externally attached such as a relay, for example.

The multi-turn information detection unit 3 includes, as the magnetism detection unit 12, the magnetic sensors 51 and 52, and analog comparators 65 and 66. The magnetism detection unit 12 detects the magnetic field formed by the magnet 11 by using the electric power supplied from the battery 32. Also, the multi-turn information detection unit 3 includes a counter 67, as the detection unit 13 shown in FIG. 1, and includes a non-volatile memory 68, as the storage unit 14. The electric power supply terminal 51$p$ of the magnetic sensor 51 is connected to the power supply line PL. The ground terminal 51$g$ of the magnetic sensor 51 is connected to the ground line GL. An output terminal 51$c$ of the magnetic sensor 51 is connected to an input terminal 65$a$ of the analog comparator 65. In the present embodiment, the output terminal 51$c$ of the magnetic sensor 51 outputs a voltage corresponding to a difference between a potential of the second output terminal 51$b$ shown in FIG. 2C and the reference potential. The analog comparator 65 is a comparator that compares a voltage output from the magnetic sensor 51 with a predetermined voltage. A power supply terminal 65$p$ of the analog comparator 65 is connected to the power supply line PL. A ground terminal 65$g$ of the analog comparator 65 is connected to the ground line GL. An output terminal 65$b$ of the analog comparator 65 is connected to a first input terminal 67$a$ of the counter 67. The analog comparator 65 outputs an H-level signal from the output terminal when an output voltage of the magnetic sensor 51 is equal to or higher than a threshold value, and outputs an L-level signal from the output terminal when the output voltage of the magnetic sensor 51 is lower than the threshold value.

The magnetic sensor 52 and the analog comparator 66 have similar configurations to the magnetic sensor 51 and the analog comparator 65. A power supply terminal 52$p$ of the magnetic sensor 52 is connected to the power supply line PL. A ground terminal 52$g$ of the magnetic sensor 52 is connected to the ground line GL. An output terminal 52$c$ of the magnetic sensor 52 is connected to an input terminal 66$a$ of the analog comparator 66. A power supply terminal 66$p$ of the analog comparator 66 is connected to the power supply line PL. A ground terminal 66$g$ of the analog comparator 66 is connected to the ground line GL. An output terminal 58$b$ of the analog comparator 66 is connected to a second input terminal 67$b$ of the counter 67. The analog comparator 66 outputs an H-level signal from the output terminal when an output voltage of the magnetic sensor 52 is equal to or higher than a threshold value, and outputs an L-level signal from the output terminal 66$b$ when the output voltage of the magnetic sensor 52 is lower than the threshold value.

The counter 67 counts the multi-turn information of the rotary shaft SF by using the electric power supplied from the battery 32. The counter 67 includes, for example, a CMOS logical circuit and the like. The counter 67 operates using the electric power that is supplied via a power supply terminal 6'7$p$ and a ground terminal 67$g$. The power supply terminal 6'7$p$ of the counter 67 is connected to the power supply line PL. The ground terminal 67$g$ of the counter 67 is connected to the ground line GL. The counter 67 performs counting processing by using a voltage that is supplied via the first input terminal 67$a$, and a voltage that is supplied via the second input terminal 67$b$, as a control signal.

The non-volatile memory 68 stores at least a part (for example, the multi-turn information) of the rotational position information detected by the detection unit 13 by using the electric power supplied from the battery 32 (performs a writing operation). The non-volatile memory 68 stores a result (multi-turn information) of the counting by the counter 67, as the rotational position information detected by the detection unit 13. A power supply terminal 68$p$ of the non-volatile memory 68 is connected to the power supply line PL. A ground terminal 68$g$ of the storage unit 14 is connected to the ground line GL. The storage unit 14 shown in FIG. 1 includes the non-volatile memory 68, and can keep the information written while the electric power is supplied, even in a state where the electric power is not supplied.

In the present embodiment, a capacitor 69 is provided between the rectifier stacks 61 and 62 and the regulator 63. A first electrode 69$a$ of the capacitor 69 is connected to a signal line for connecting the rectifier stacks 61 and 62 and the control terminal 63$a$ of the regulator 63. A second electrode 69$b$ of the capacitor 69 is connected to the ground line GL. The capacitor 69 is a so-called smoothing capacitor, and reduces pulsation to reduce a load of the regulator. A constant of the capacitor 69 is set so that the electric power supply from the battery 32 to the detection unit 13 and the storage unit 14 is kept for a time period in which the rotational position information is detected by the detection unit 13 and the rotational position information is written into the storage unit 14, for example.

Also, the battery 32 includes, for example, a primary battery 36 such as a button-shaped battery and a rechargeable secondary battery 37. The secondary battery 37 is electrically connected to a power supply unit MCE of the motor control unit MC. During at least a part of a time period (for example, a time period in which a main power supply is in an on state) in which the power supply unit MCE of the motor control unit MC can supply the electric power, the electric power is supplied from the power supply unit MCE to the secondary battery 37, and the secondary battery 37 is recharged by the electric power. During a time period (for example, a time period in which a main power supply is in an off state) in which the power supply unit MCE of the motor control unit MC cannot supply the electric power, the supply of the electric power from the power supply unit MCE to the secondary battery 37 is cut off.

Also, the secondary battery 37 may be electrically connected to a transmission path of the electric signals from the electric signal generation units 31A and 31B. In this case, the secondary battery 37 can be recharged by the electric power of the electric signals from the electric signal generation units 31A and 31B. For example, the secondary battery 37 is electrically connected to a circuit between the rectifier stack 61 and the regulator 63. The secondary battery 37 can be recharged by the electric power of the electric signals that are generated from the electric signal generation units 31A and 31B by the rotation of the rotary shaft SF, in a state where the supply of the electric power from the power supply unit MCE is cut off. Note that the secondary battery 37 may also be recharged by the electric power of the electric signals that are generated from the electric signal generation units 31A and 31B as the motor M is driven to rotate the rotary shaft SF.

The encoder device EC in accordance with the present embodiment selects to supply the electric power from which of the primary battery 36 and the secondary battery 37 to the position detection system 1, in a state where the supply of the electric power from an outside is cut off. The electric power supplying system 2 includes a power supply switcher (a power supply selection unit, a selection unit) 38, and the power supply switcher 38 switches (selects) to supply the electric power from which of the primary battery 36 and the secondary battery 37 to the position detection system 1. A first input terminal of the power supply switcher 38 is electrically connected to a positive electrode of the primary battery 36, and a second input terminal of the power supply switcher 38 is electrically connected to the secondary battery 37. An output terminal of the power supply switcher 38 is electrically connected to the input terminal 63b of the regulator 63.

The power supply switcher 38 selects the primary battery 36 or the secondary battery 37, as the battery for supplying the electric power to the position detection system 1, based on a remaining amount of the secondary battery 37, for example. For example, when a remaining amount of the secondary battery 37 is equal to or greater than a threshold value, the power supply switcher 38 supplies the electric power from the secondary battery 37, and does not supply the electric power from the primary battery 36. The threshold value is set, based on electric power that is consumed in the position detection system 1, and is set equal to or higher than the electric power that is to be supplied to the position detection system 1, for example. For example, when the electric power that is consumed in the position detection system 1 can be covered by the electric power that from the secondary battery 37, the power supply switcher 38 supplies the electric power from the secondary battery 37, and does not supply the electric power from the primary battery 36. Also, when the remaining amount of the secondary battery 37 is less than the threshold value, the power supply switcher 38 supplies the electric power from the primary battery 36, and does not supply the electric power from the secondary battery 37. The power supply switcher 38 may also serve as a charger for controlling the recharging of the secondary battery 37, for example, and may determine whether the remaining amount of the secondary battery 37 is equal to or greater than the threshold value by using remaining amount information of the secondary battery 37 that is used for control of the recharging.

The secondary battery 37 is used in a combined manner in this way, so that it is possible to delay the consumption of the primary battery 36. Therefore, the encoder device EC has no maintenance (for example, replacement) of the battery 32 or the maintenance frequency is low. Note that the battery 32 may include at least one of the primary battery 36 and the secondary battery 37. Also, in the above embodiment, the electric power is alternatively supplied from the primary battery 36 or the secondary battery 37. However, the electric power may be supplied from both the primary battery 36 and the secondary battery 37. For example, a processing unit to which the primary battery 36 supplies the electric power and a processing unit to which the secondary battery 37 supplies the electric power may be determined, in accordance with power consumption of each processing unit (for example, the magnetic sensor 51, the counter 67 and the non-volatile memory 68) of the position detection system 1. Note that the secondary battery 37 may be recharged using at least one of the electric power that is supplied from a power supply unit EC2 and the electric power of the electric signals that are generated from the electric signal generation units 31A and 31B.

Figure 5:
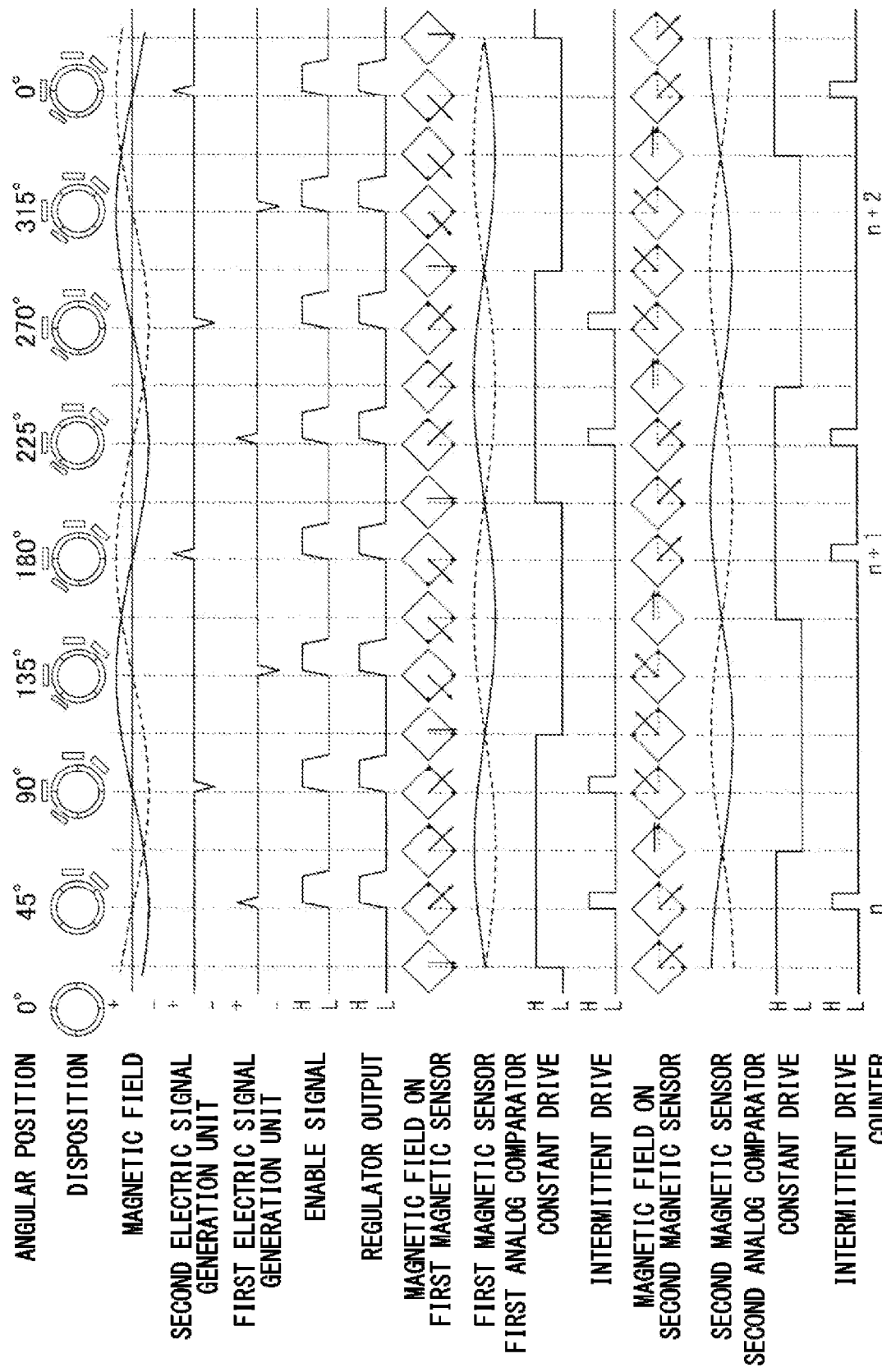
FIG. 5 shows operations of the encoder device shown in FIG. 1 during forward rotation.

Subsequently, operations of the electric power supplying system 2 and the multi-turn information detection unit 3 are described. FIG. 5 is a timing chart showing operations of the multi-turn information detection unit 3 when the rotary shaft SF rotates in the counterclockwise direction (forward rotation). Since a timing chart showing operations of the multi-turn information detection unit 3 when the rotary shaft SF rotates in the counterclockwise direction (reverse rotation) is inverted to the chart of FIG. 4 over time, the descriptions thereof are omitted.

In "Magnetic field" of FIG. 5, a solid line indicates a magnetic field at the position of the first electric signal generation unit 31A, and a broken line indicates a magnetic field at the position of the second electric signal generation unit 31B. "First electric signal generation unit", and "Second electric signal generation unit" indicate an output of the first electric signal generation unit 31A and an output of the second electric signal generation unit 31B, respectively, and an output of current flowing in one direction is denoted as positive (+), and an output of current flowing in an opposite direction thereof is denoted as negative (−). "Enable signal" indicates a potential that is applied to the control terminal 63a of the regulator 63 by the electric signals generated from the electric signal generation units 31A and 31B, and a high level is denoted as "H" and a low level is denoted as "L". "Regulator" indicates an output of the regulator 63, and a high level is denoted as "H" and a low level is denoted as "L".

In FIG. 5, "Magnetic field on first magnetic sensor" and "Magnetic field on second magnetic sensor" are magnetic fields formed on the magnetic sensors 51 and 52. The magnetic field formed by the magnet 11 is shown with a long broken line, the magnetic field formed by a bias magnet is shown with a short broken line, and a synthetic magnetic field thereof is shown with a solid line. "First magnetic sensor" and "Second magnetic sensor" each indicate outputs when the magnetic sensors 51 and 52 are constantly driven, an output from the first output terminal is shown with a broken line, and an output from the second output terminal is shown with a solid line. "First analog comparator" and "Second analog comparator" indicate outputs from the analog comparators 65 and 66, respectively. An output when the magnetic sensor and the analog comparator are constantly driven is denoted as "constant drive", and an output when the magnetic sensor and the analog comparator are intermittently driven is denoted as "intermittent drive".

When the rotary shaft SF rotates in the counterclockwise direction, the first electric signal generation unit 31A outputs the current pulse flowing in the forward direction ("+" of "first electric signal generation unit"), at the angular positions of 45° and 225°. Also, the first electric signal generation unit 31A outputs the current pulse flowing in the reverse direction ("−" of "first electric signal generation unit"), at the angular positions of 135° and 315°. The second electric signal generation unit 31B outputs the current pulse flowing in the reverse direction ("−" of "second electric signal generation unit"), at the angular positions of 90° and 270°. Also, the second electric signal generation unit 31B outputs the current pulse flowing in the forward direction ("−" of "second electric signal generation unit"), at the angular positions of 180° and 0° (360°). For this reason, the enable signal is switched to a high level at each of the angular positions of 45°, 90°, 135°, 180°, 225°, 270°, 315°, and 0°. Also, the regulator 63 supplies a predetermined voltage to the power supply line PL at each of the angular positions of 45°, 90°, 135°, 180°, 225°, 270°, 315°, and 0°, in a state where the enable signal is held at the high level.

In the present embodiment, the output of the magnetic sensor 51 and the output of the magnetic sensor 52 have a phase difference of 90°, and the detection unit 13 detects the rotational position information by using the phase difference. The output of the magnetic sensor 51 is a positive sine wave in a range from the angular position 22.5° to the angular position 112.5°. In the angle range, the regulator 63 outputs the electric power at the angular positions of 45° and 90°. The magnetic sensor 51 and the analog comparator 65 are driven by the electric power supplied at each of the angular positions of 45° and 90°. A signal (hereinafter, referred to as "A-phase signal") that is output from the analog comparator 65 is kept at an L-level in a state where the electric power is not supplied, and is an H-level at each of the angular positions of 45° and 90°.

Also, the output of the magnetic sensor 52 is a positive sine wave in a range from the angular position of 157.5° to the angular position of 247.5°. In the angle range, the regulator 63 outputs the electric power at the angular positions of 180° and 225°. The magnetic sensor 52 and the analog comparator 66 are driven by the electric power supplied at each of the angular positions of 180° and 225°. A signal (hereinafter, referred to as "B-phase signal") that is output from the analog comparator 66 is kept at an L-level in a state where the electric power is not supplied, and is an H-level at each of the angular positions of 180° and 225°.

Herein, when the A-phase signal supplied to the counter 67 is an H-level (H) and the B-phase signal supplied to the counter 67 is an L-level, a set of the signal levels is denoted as (H, L). In FIG. 5, a set of the signal levels at the angular position of 180° is (L, H), a set of the signal levels at the angular position of 225° is (H, H), and a set of the signal levels at the angular position of 270° is (H, L).

When one or both of the detected A-phase signal and B-phase signal is an H-level, the counter 67 stores the set of the signal levels in the storage unit 14. When one or both of the A-phase signal and B-phase signal detected next time is an H-level, the counter 67 reads out the set of the previous signal levels from the storage unit 14 and compares the set of the previous signal levels and a set of the current signal levels to determine the rotating direction of the rotary shaft SF. For example, when the set of the previous signal levels is (H, H) and the set of the current signal levels is (H, L), since the angular position in the previous detection is 225° and the angular position in the current detection is 270°, it can be seen that it is a counterclockwise direction (forward rotation). When the set of the current signal levels is (H, L) and the set of the previous signal levels is (H, H), the counter 67 supplies an up signal, which indicates that the counter will be counted up, to the storage unit 14. When the up signal from the counter 67 is detected, the storage unit 14 updates the stored multi-turn information to a value increased by 1. In this way, the multi-turn information detection unit 3 in accordance with the present embodiment can detect the multi-turn information while determining the rotating direction of the rotary shaft SF.

In this way, the encoder device EC in accordance with the present embodiment comprises the position detection system 1 (position detection unit) that detects the rotational position information of the rotary shaft SF (moving part) of the motor M (power supplying unit); the magnet 11 that rotates in conjunction with the rotary shaft SF and has a plurality of polarities along the rotating direction of the rotary shaft SF (the moving direction or the θ direction); and the electric signal generation unit 31A (electric signal generation unit) that has the magnetosensitive member 47 (magnetosensitive part 41A) whose magnetic characteristic is changed by the change in magnetic field associated with relative movement to the magnet 11, and generates the electric signal, based on the magnetic characteristic of the magnetosensitive member 47, wherein the magnetosensitive member 47 is disposed so that magnetosensitive member 47 is spaced apart from a side surface of the magnet 11 in the direction orthogonal to the rotating direction and the length direction of the magnetosensitive member 47 is orthogonal to the tangential directions of at least some of the magnetic field lines MF2 of the magnet 11.

According to the present embodiment, a magnetic field component unnecessary for pulse generation in the electric signal generation unit 31A including magnetic field lines generated on the side surface of the magnet 11 is orthogonal to the length direction of the magnetosensitive member 47, and the unnecessary magnetic field component does not adversely affect the generation of the magnetic domain wall from one end toward the other end in the length direction of the magnetosensitive member 47 caused by the reversal of the AC magnetic field due to the rotation of the magnet 11. For this reason, even when the magnetosensitive member 47 is disposed near the magnet 11 and the electric signal generation unit 31A is thus made small, it is possible to effectively generate the high-output pulse (electric signal) with high reliability (stable output) by using the electric signal generation unit 31A through the reversal of the AC magnetic field in the axial direction due to the rotation of the magnet 11, without being affected by the unnecessary magnetic field component. Also, in a case where the encoder device EC comprises the battery 32, it is possible to omit the maintenance (for example, replacement) of the battery 32 or to reduce the maintenance frequency of the battery 32 by using the electric signal effectively generated from the electric signal generation unit 31A.

Note that in order to suppress the effect of the magnetic field component unnecessary for pulse generation in the electric signal generation unit 31A, it is also considered to cover the circumference of the magnetosensitive member 47 with a magnetic body. However, when the circumference of the magnetosensitive member 47 is covered with the magnetic body, the electric signal generation unit becomes larger, which increases the cost and makes it difficult to incorporate the electric signal generation unit into the drive device. Also, a resonance point of the electric signal generation unit 31A is lowered, so that it may become weak against vibration shock.

Also, in the encoder device EC, the electric power is supplied from the battery 32 to the multi-turn information detection unit 3 in a short time after the electric signal is generated from the electric signal generation unit 31A, so that the multi-turn information detection unit 3 is dynamically driven (intermittently driven). After the detection and writing of the multi-turn information are over, the power delivery to the multi-turn information detection unit 3 is cut off but the counted value is kept because it is stored in the storage unit 14. The sequence is repeated each time the predetermined position on the magnet 11 passes near the electric signal generation unit 31A, even in a state where the supply of the electric power from the outside is cut off. Also, the multi-turn information stored in the storage unit 14 is read by the motor control unit MC and the like when the motor M starts next time, and is used to calculate an initial position of the rotary shaft SF, and the like. In the encoder device EC, the battery 32 supplies at least a part of the electric power that is consumed in the position detection system 1, in accordance with the electric signal generated from the electric signal generation unit 31A. Therefore, it is possible to increase the lifetime of the battery 32. For this reason, it is possible to omit the maintenance (for example, replacement) of the battery 32 or to reduce the maintenance frequency of the battery 32. For example, when the lifetime of the battery 32 is longer than other parts of the encoder device EC, it may be unnecessary to replace the battery 32.

In the meantime, when a magnetosensitive wire such as a Wiegand wire is used, the pulse current (electric signal) is obtained from the electric signal generation unit 31A even though the magnet 11 is rotated at extremely low speed. For this reason, for example, in the state where the electric power is not supplied to the motor M, even though the rotary shaft SF (magnet 11) is rotated at extremely low speed, the output of the electric signal generation unit 31A can be used as the electric signal. Note that as the magnetosensitive wire (first magnetosensitive part 41A), an amorphous magnetostrictive wire and the like can also be used. In this case, for example, the encoder device EC may perform full-wave rectification on the electric signal (current) generated from the electric signal generation unit (for example, 31A and 31B) by using the rectifier stack (for example, a rectifier), and to supply the rectified electric power to the multi-turn information detection unit 3 and the like.

Also, in the present embodiment, as shown in FIG. 3A, since the tip end portions of the first and second magnetic bodies 45A and 46A of the electric signal generation unit 31A are disposed near the parts whose polarities are different from each other at the same angular positions on the front surface (N pole 16A to the S pole 16D) and back surface (S pole 17A to the N pole 17D) of the magnet 11, the electric signal generation unit 31A can be made further smaller. Note that like an electric signal generation unit 31C of a modified embodiment shown in FIGS. 3D and 3E, a tip end portion of a first magnetic body 45C on one end-side of the magnetosensitive member 47 may be disposed near a part (for example, the N pole 16A, the S pole 16B or the like) having any polarity on the front surface of the magnet 11, and a tip end portion of a second magnetic body 46C on the other end-side of the magnetosensitive member 47 may be disposed near a part (for example, the S pole 16D, the N pole 16A or the like) having different polarity on the front surface of the magnet 11. In this case, the first and second magnetic bodies 45C and 46C guide the magnetic field lines from the two parts (for example, the N pole 16A and the S pole 16D) of the magnet 11, which are located at different positions in the rotating direction and have polarities different from each other, to the length direction of the magnetosensitive member 47. Also in the electric signal generation unit 31C, a magnetic circuit MC2 is formed from the magnet 11 so as to pass the first magnetic body 45C, the magnetosensitive member 47 and the second magnetic body 46C. Therefore, the magnetosensitive member 47 can effectively output the stable pulse by the reversal of the AC magnetic field due to the rotation of the magnet 11, without being affected by the unnecessary magnetic field on the side surface of the magnet 11.

In the above embodiment, the two electric signal generation units 31A and 31B are provided. However, the encoder device EC may comprise only one electric signal generation unit 31A. Also, the encoder device EC may comprise three or more electric signal generation units. Also, in other embodiments and modified embodiments thereof to be described later, one electric signal generation unit will be described. However, a plurality of electric signal generation units may be provided.

Second Embodiment

Figure 6A:
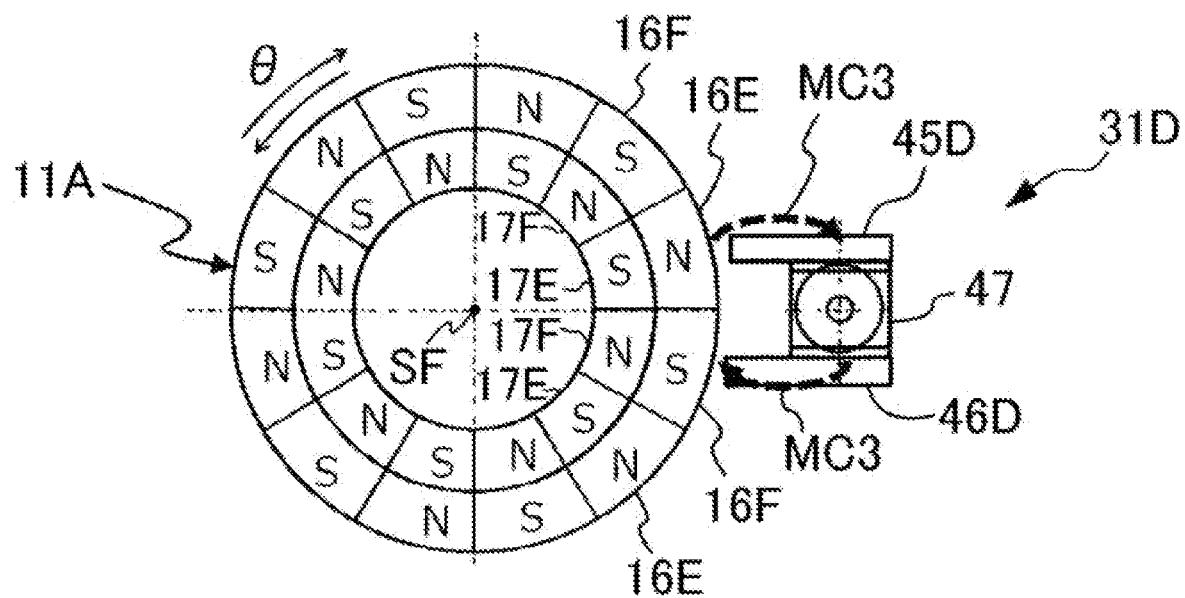
FIG. 6A is a plan view showing a magnet and an electric signal generation unit in accordance with a second embodiment
Figure 6B:
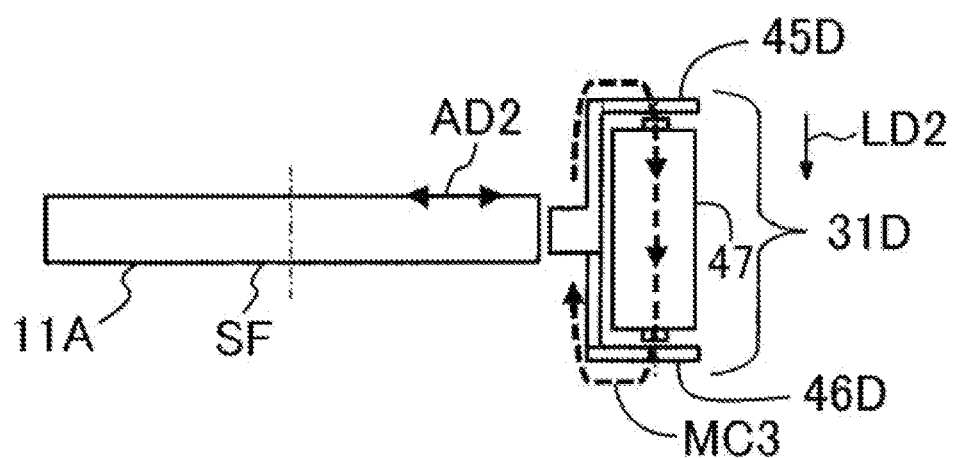
FIG. 6B is a side view of FIG. 6A.
Figure 6C:
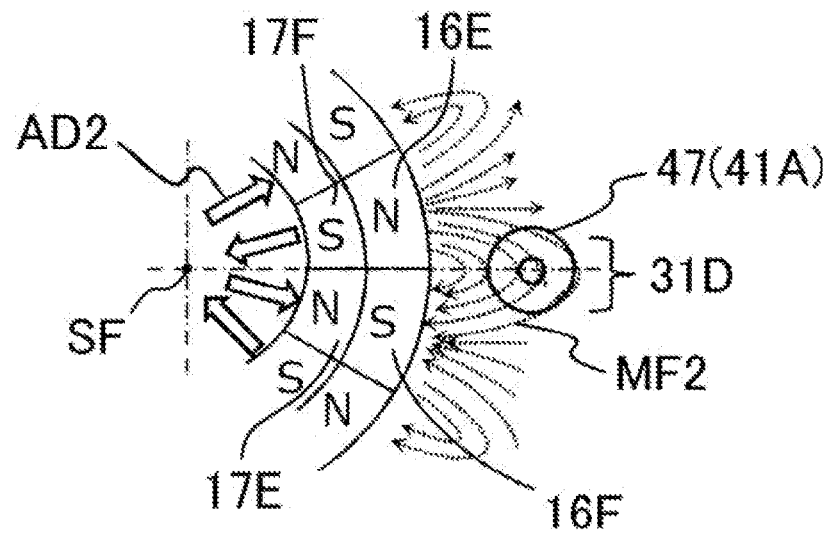
FIG. 6C is an enlarged view showing a part of the magnet shown in FIG. 6A.

A second embodiment is described with reference to FIGS. 6A to 6E. Note that in FIGS. 6A to 6D, the parts corresponding to FIGS. 3A to 3C are denoted with the same reference signs, and the detailed descriptions thereof are omitted. FIG. 6A is a plan view showing a magnet 11A and an electric signal generation unit 31D of an encoder device in accordance with the present embodiment, FIG. 6B is a side view of FIG. 6A, and FIG. 6C is an enlarged view showing a part of FIG. 6A. In FIGS. 6A and 6B, the magnet 11A is configured so that the direction and strength of the magnetic field in a radial direction (or the diametrical direction, or a radiation direction) AD2 with respect to the rotary shaft SF are changed by rotation. The magnet 11A is, for example, an annular member that is coaxial with the rotary shaft SF. The main surfaces (front surface and back surface) of the magnet 11A are substantially perpendicular to the rotary shaft SF, respectively.

The magnet 11A includes an annular magnet on an outer periphery-side where an N pole 16E and an S pole 16F are alternately disposed in the rotating direction or the circumferential direction (θ direction) of the rotary shaft SF and an annular magnet on an inner periphery-side where an S pole 17E and an N pole 17F are alternately disposed in the θ direction. Phases of the annular magnet on the outer periphery-side and the annular magnet on the inner periphery-side are offset by 180°. In the magnet 11A, a boundary between the S pole 17E and the N pole 17F on the inner periphery-side substantially matches a boundary between the N pole 16E and the S pole 16F on the outer periphery-side, with respect to the angular position in the θ direction. The magnet 11A has a flat plate shape along the θ direction, and a plurality of polarities (the N pole 16E, the S pole 16F and the like) along the θ direction. Also, in the magnet 11A, a direction orthogonal to the rotating direction (moving direction), i.e., in the present embodiment, the radial direction AD2 with respect to the rotary shaft SF is regarded as a width direction of the magnet 11A. The magnet 11A has polarities (the N pole 16E, the S pole 17E and the like) different from each other in the width direction (radial direction AD2) orthogonal to the θ direction, on the front surface or back surface. The magnet 11A is a permanent magnet magnetized to have a plurality of pairs of polarities (for example, 12 pairs) in the θ direction. In the present embodiment, a magnetization direction (orientation direction) of the magnet 11A is the radial direction AD2.

In the present embodiment, the magnetosensitive member 47 of the electric signal generation unit 31D is disposed so that the length direction LD2 is orthogonal to the front surface of the magnet 11A having a flat plate shape, in the vicinity of an outer surface of the magnet 11A. Also, the length direction LD2 of the magnetosensitive member 47 in the electric signal generation unit 31D is disposed to be orthogonal to the radial direction AD2 with being spaced in the diametrical direction (for example, the radial direction) of the magnet 11A orthogonal to the rotary shaft SF or in a direction parallel to the diametrical direction. In this case, the length direction LD2 is parallel to the axial direction of the rotary shaft SF. In other words, in the present embodiment, the length direction LD2 of the magnetosensitive member 47 is substantially orthogonal to the radial direction AD2 that is the magnetization direction of the magnet 11A, and is also substantially orthogonal to the θ direction (circumferential direction). Also, a tip end portion of a first magnetic body 45D on one end-side of the magnetosensitive member 47 is disposed near an outer surface of a part of one polarity (for example, the N pole 16E) on the outer periphery-side of the magnet 11A, and a tip end portion of a second magnetic body 46D on the other end-side of the magnetosensitive member 47 is disposed near an outer surface of a part (for example, the S pole 16F) of the other polarity (polarity different from the one polarity) on the outer periphery-side of the magnet 11A. In other words, the first and second magnetic bodies 45D and 46D guide the magnetic field lines from the two parts (for example, the N pole 16E and the S pole 16F) of the magnet 11A, which are located at different positions in the θ direction and have polarities different from each other, to the length direction LD2 of the magnetosensitive member 47. The other configurations are similar to the first embodiment.

Also in the present embodiment, a magnetic circuit MC3 is formed from the magnet 11A so as to pass the first magnetic body 45D, the magnetosensitive member 47, and the second magnetic body 46D. Also, as shown in FIG. 6C, the length direction of the magnetosensitive member 47 is disposed so as to be substantially orthogonal to a tangential direction (herein, the θ direction) of the magnetic field line MF2, which passes through a substantial center in the length direction of the magnetosensitive member 47, of the magnetic field lines generated on the side surface of the magnet 11A.

A magnetic field component unnecessary for pulse generation in the electric signal generation unit 31D including magnetic field lines generated on the side surface of the magnet 11A is orthogonal to the length direction of the magnetosensitive member 47, and the unnecessary magnetic field component does not adversely affect the generation of the magnetic domain wall from one end toward the other end of the magnetosensitive member 47 caused by the reversal of the AC magnetic field due to the rotation of the magnet 11A. For this reason, even when the magnetosensitive member 47 is disposed near the magnet 11A and the electric signal generation unit 31D is thus made small, it is possible to effectively generate the high-output pulse (electric signal) by using the electric signal generation unit 31D through the reversal of the AC magnetic field in the radial direction AD2 due to the rotation of the magnet 11A, without being affected by the unnecessary magnetic field component. Also, in a case where the encoder device comprises the battery 32, it is possible to omit the maintenance (for example, replacement) of the battery 32 or to reduce the maintenance frequency of the battery 32 by using the electric signal effectively generated from the electric signal generation unit 31D.

Figure 6D:
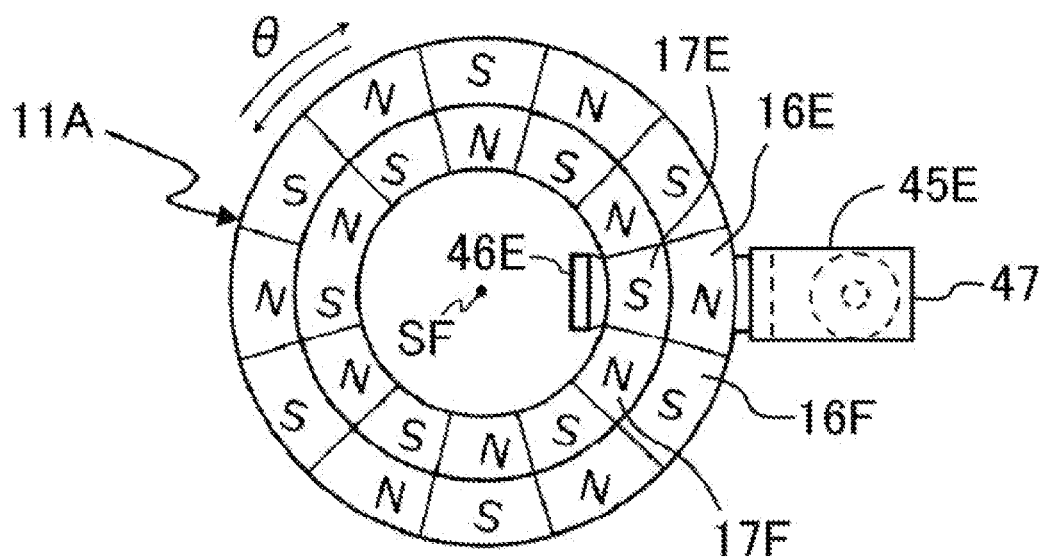
FIG. 6D is a plan view showing a modified embodiment.
Figure 6E:
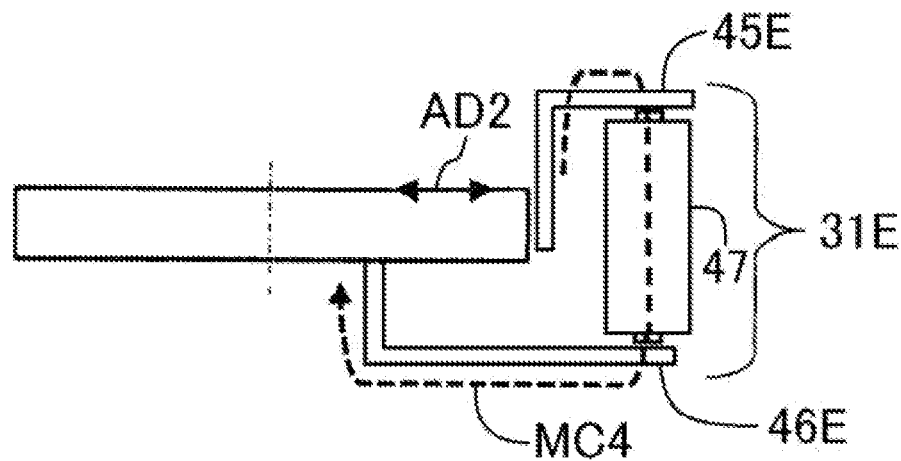
FIG. 6E is a side view of FIG. 6D.

Note that in the present embodiment, like an electric signal generation unit 31E of a modified embodiment shown in FIGS. 6D and 6E, a tip end portion of a first magnetic body 45E on one end-side of the magnetosensitive member 47 may be disposed near a part (for example, the N pole 16E, the S pole 16F or the like) of one polarity on the outer periphery-side of the magnet 11A, and a tip end portion of a second magnetic body 46E on the other end-side of the magnetosensitive member 47 may be disposed near a part (for example, the S pole 17E, the N pole 17F or the like) of different polarity on the inner periphery-side of the magnet 11A. In this case, the first and second magnetic bodies 45E and 46E guide the magnetic field lines from the two parts (for example, the N pole 16E and the S pole 17E) of the magnet 11A, which are located at different positions in the width direction (radial direction AD2) of the magnet 11A and have polarities different from each other, to the length direction of the magnetosensitive member 47. Also in the electric signal generation unit 31E, a magnetic circuit MC4 is formed from the magnet 11A so as to pass the first magnetic body 45E, the magnetosensitive member 47, and the second magnetic body 46E. Therefore, the magnetosensitive member 47 can effectively output the stable pulse by the reversal of the AC magnetic field due to the rotation of the magnet 11A, without being affected by the unnecessary magnetic field on the side surface of the magnet 11A.

Third Embodiment

Figure 7A:
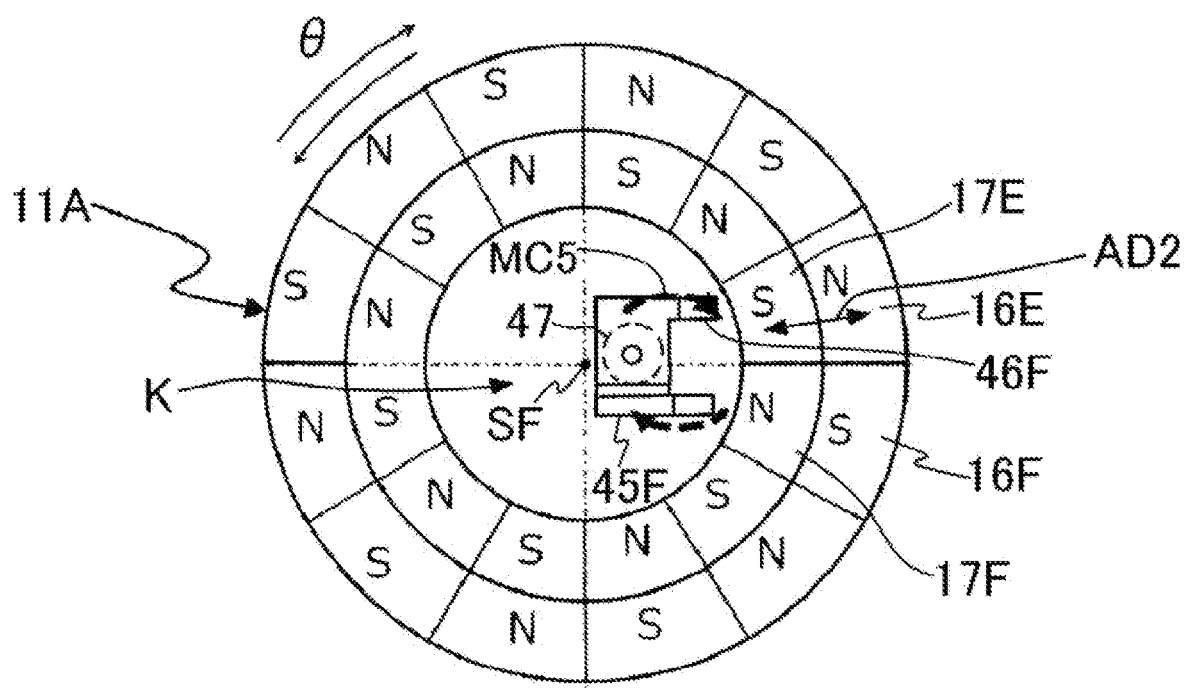
FIG. 7A is a plan view showing a magnet and an electric signal generation unit in accordance with a third embodiment.
Figure 7B:
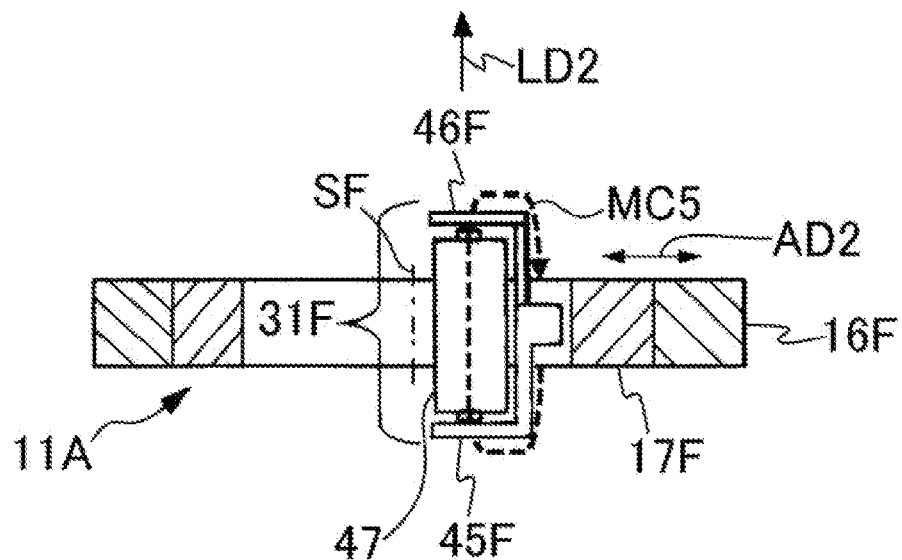
FIG. 7B is a sectional view of FIG. 7A.

A third embodiment is described with reference to FIGS. 7A to 7C. Note that in FIGS. 7A to 7C, the parts corresponding to FIGS. 6A to 6C are denoted with the same reference signs, and the detailed descriptions thereof are omitted. FIG. 7A is a plan view showing a magnet 11A and an electric signal generation unit 31F of an encoder device in accordance with the present embodiment, and FIG. 7B is a side view showing the magnet 11A shown in FIG. 7A, as a sectional view. In FIGS. 7A and 7B, the magnet 11A is configured so that the direction and strength of the magnetic field in the radial direction AD2 with respect to the rotary shaft SF are changed by rotation.

In the present embodiment, the magnetosensitive member 47 of the electric signal generation unit 31F is disposed in a space K so that the length direction LD2 is orthogonal to the front surface of the magnet 11A having a flat plate shape, in the vicinity of an inner surface of the magnet 11A having the space K inside. Also, the length direction LD2 of the magnetosensitive member 47 in the electric signal generation unit 31F is disposed to be orthogonal to the radial direction AD2 with being spaced in a diametrical direction (for example, the radial direction) of the magnet 11A orthogonal to the rotary shaft SF or in a direction parallel to the diametrical direction. In the present embodiment, the length direction LD2 of the magnetosensitive member 47 is substantially orthogonal to the radial direction AD2 that is the magnetization direction of the magnet 11A, and is also substantially parallel to the axial direction of the rotary shaft SF. Also, a tip end portion of a first magnetic body 45F on one end-side of the magnetosensitive member 47 is disposed near an inner surface of a part of one polarity (for example, the N pole 17F) on the inner periphery-side of the magnet 11A, and a tip end portion of a second magnetic body 46F on the other end-side of the magnetosensitive member 47 is disposed near an inner surface of a part (for example, the S pole 17E) of the other polarity on the inner periphery-side of the magnet 11A. In other words, the first and second magnetic bodies 45F and 46F guide the magnetic field lines from the two parts (for example, the N pole 17F and the S pole 17E) of the magnet 11A, which are located at different positions in the θ direction and have polarities different from each other, to the length direction LD2 of the magnetosensitive member 47. The other configurations are similar to the first embodiment.

Also in the present embodiment, a magnetic circuit MC5 is formed from the magnet 11A so as to pass the first magnetic body 45F, the magnetosensitive member 47, and the second magnetic body 46F. Also, the length direction of the magnetosensitive member 47 is disposed so as to be substantially orthogonal to a tangential direction (herein, the θ direction) of the magnetic field line, which passes through a substantial center in the length direction LD2 of the magnetosensitive member 47, of the magnetic field lines generated on the inner surface of the magnet 11A. A magnetic field component unnecessary for pulse generation in the electric signal generation unit 31F including magnetic field lines generated on the inner surface of the magnet 11A is orthogonal to the length direction of the magnetosensitive member 47, and the unnecessary magnetic field component does not adversely affect the generation of the magnetic domain wall from one end toward the other end of the magnetosensitive member 47 caused by the reversal of the AC magnetic field due to the rotation of the magnet 11A. For this reason, even when the magnetosensitive member 47 is disposed on the inner surface of the magnet 11A and the electric signal generation unit 31F is thus made small, it is possible to effectively generate the high-output pulse (electric signal) by using the electric signal generation unit 31F through the reversal of the AC magnetic field in the radial direction AD2 due to the rotation of the magnet 11A, without being affected by the unnecessary magnetic field component. The other effects are similar to the above-described embodiments.

Figure 7C:
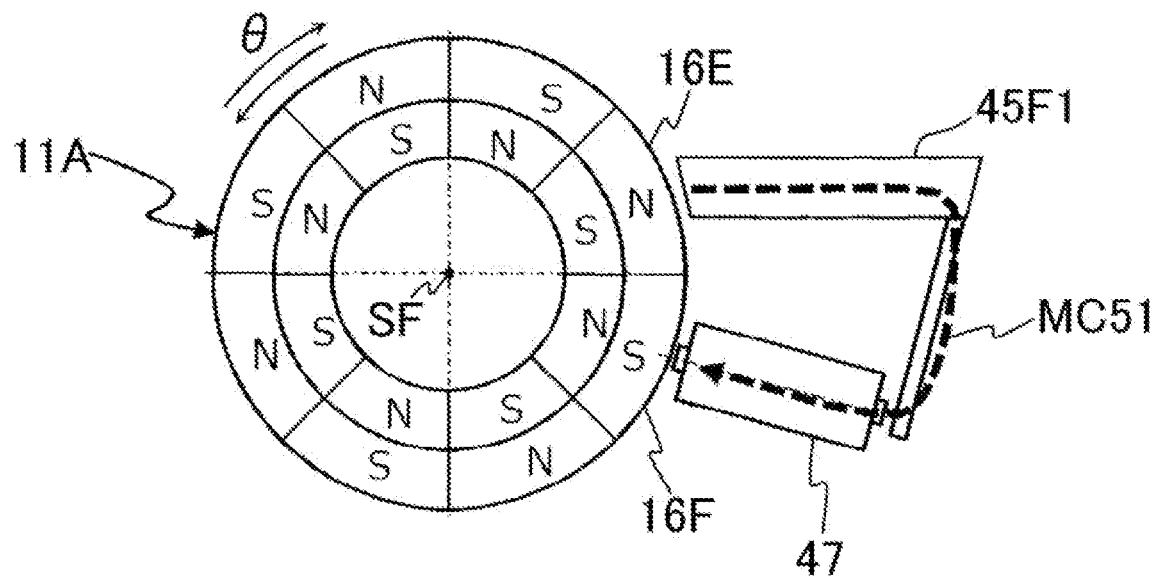
FIG. 7C is a plan view showing a modified embodiment.

Note that in the present embodiment, like an electric signal generation unit of a modified embodiment shown in FIG. 7C, the magnetosensitive member 47 may be disposed on an outer surface of the magnet 11A so that the length direction of the magnetosensitive member 47 is substantially perpendicular to the outer surface. In this case, a tip end portion of a magnetic body 45F1 on one end-side of the magnetosensitive member 47 is disposed near a part (for example, the N pole 16E, the S pole 16F or the like) of one polarity on the outer periphery-side of the magnet 11A, and the other end of the magnetosensitive member 47 is disposed near a part (for example, the S pole 16F, the N pole 16E or the like) of different polarity on the outer periphery-side of the magnet 11A. In this case, one end of the magnetic body 45F1 is disposed near one end-side of the magnetosensitive member 47, and the other end of the magnetic body 45F1 is disposed near the part of one polarity on the outer periphery-side of the magnet 11A. In other words, in the present modified embodiment, the other magnetic body (the first magnetic body or the second magnetic body) is omitted. In the present modified embodiment, the length direction of the magnetosensitive member 47 is substantially parallel to the radial direction that is the magnetization direction of the magnet 11A, and is also substantially orthogonal to the θ direction (circumferential direction).

In the present modified embodiment, a magnetic circuit MC51 is formed from the magnet 11A so as to pass the magnetic body 45F1 and the magnetosensitive member 47. Therefore, the magnetosensitive member 47 can effectively output the stable pulse by the reversal of the AC magnetic field due to the rotation of the magnet 11A, without being affected by the unnecessary magnetic field on the side surface of the magnet 11A.

Fourth Embodiment

A fourth embodiment is described with reference to FIGS. 8A to 8E. Note that in FIGS. 8A to 8E, the parts corresponding to FIGS. 3A to 3C are denoted with the same reference signs, and the detailed descriptions thereof are omitted.

Figure 8A:
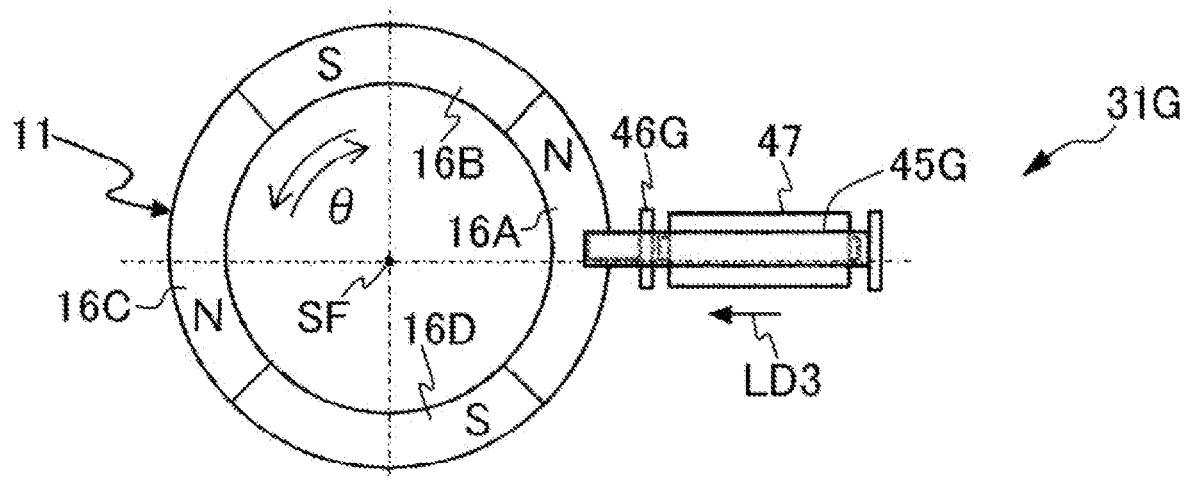
FIG. 8A is a plan view showing a magnet and an electric signal generation unit in accordance with a fourth embodiment
Figure 8B:
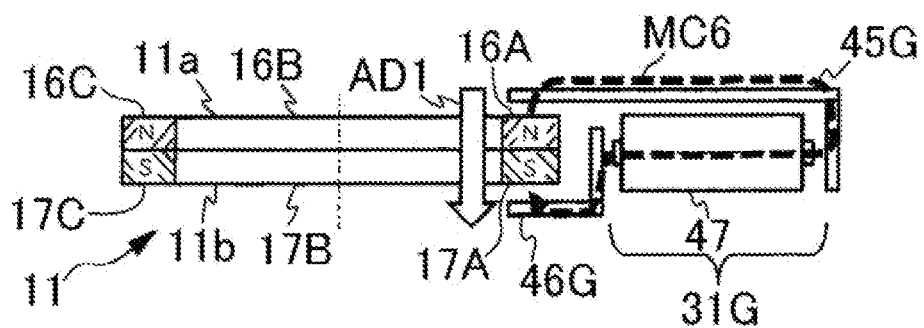
FIG. 8B is a sectional views of FIG. 8A.
Figure 8C:
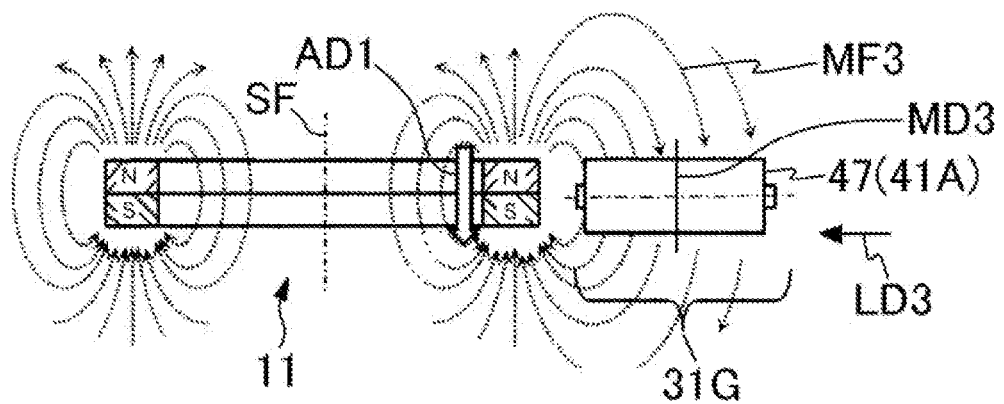
FIG. 8C is a sectional views of FIG. 8A.

FIG. 8A is a plan view showing a magnet 11 and an electric signal generation unit 31G of an encoder device in accordance with the present embodiment, and FIGS. 8B and 8C are side views showing the magnet 11 shown in FIG. 8A, as sectional views. In FIGS. 8A and 8B, the magnet 11 is configured so that the direction and strength of the magnetic field in the axial direction AD1 parallel to the rotary shaft SF are changed by rotation. The magnet 11 has a plurality of polarities (for example, the N pole 16A and the S pole 16B) in the θ direction, and also has parts (for example, the N pole 16A and the S pole 17A) of two polarities different from each other in the thickness direction (radial direction AD2) orthogonal to the θ direction. The magnetization direction of the magnet 11 is the axial direction AD1.

In the present embodiment, the magnetosensitive member 47 of the electric signal generation unit 31G is disposed so that the length direction LD3 of the magnetosensitive member 47 is parallel to the front surface of the magnet 11 having a flat plate shape and the length direction LD3 is perpendicular to the outer surface of the magnet 11, in the vicinity of the outer surface of the magnet 11. Also, the length direction LD3 of the magnetosensitive member 47 in the electric signal generation unit 31G is disposed to be orthogonal to the axial direction AD1 with being spaced in the diametrical direction (for example, the radial direction) of the magnet 11 orthogonal to the rotary shaft SF or in a direction parallel to the diametrical direction. In the present embodiment, the length direction LD3 of the magnetosensitive member 47 is substantially orthogonal to the axial direction AD1 that is the magnetization direction of the magnet 11, is substantially parallel to the radial direction of the rotary shaft SF, and is substantially orthogonal to the θ direction (circumferential direction). Also, a tip end portion of a first magnetic body 45G on one end-side of the magnetosensitive member 47 is disposed near a part of one polarity (for example, the N pole 16A) on the front surface-side of the magnet 11, and a tip end portion of a second magnetic body 46G on the other end-side of the magnetosensitive member 47 is disposed near a part (for example, the S pole 17A) of the other polarity on the back surface-side of the magnet 11. In other words, the first and second magnetic bodies 45G and 46G guide the magnetic field lines from the two parts (for example, the N pole 16A and the S pole 17A) of the magnet 11, which are located at same angular position in the θ direction and have polarities different from each other, to the length direction LD3 of the magnetosensitive member 47. The other configurations are similar to the first embodiment.

Also in the present embodiment, a magnetic circuit MC6 is formed from the magnet 11 so as to pass the first magnetic body 45G, the magnetosensitive member 47, and the second magnetic body 46G. Also, as shown in FIG. 8C, the length direction LD3 of the magnetosensitive member 47 is disposed so as to be substantially orthogonal to a tangential direction MD3 (herein, parallel to the axial direction AD1) of the magnetic field line MF3, which passes through a substantial center in the length direction LD3 of the magnetosensitive member 47, of the magnetic field lines generated on the side surface of the magnet 11.

A magnetic field component unnecessary for pulse generation in the electric signal generation unit 31G including magnetic field lines generated on the side surface of the magnet 11 is orthogonal to the length direction of the magnetosensitive member 47, and the unnecessary magnetic field component does not adversely affect the generation of the magnetic domain wall from one end toward the other end of the magnetosensitive member 47 caused by the reversal of the AC magnetic field due to the rotation of the magnet 11. For this reason, even when the magnetosensitive member 47 is disposed near the magnet 11 and the electric signal generation unit 31G is thus made small, it is possible to effectively generate the high-output pulse (electric signal) by using the electric signal generation unit 31G through the reversal of the AC magnetic field in the axial direction AD1 due to the rotation of the magnet 11, without being affected by the unnecessary magnetic field component. The other effects are similar to the first embodiment.

Figure 8D:
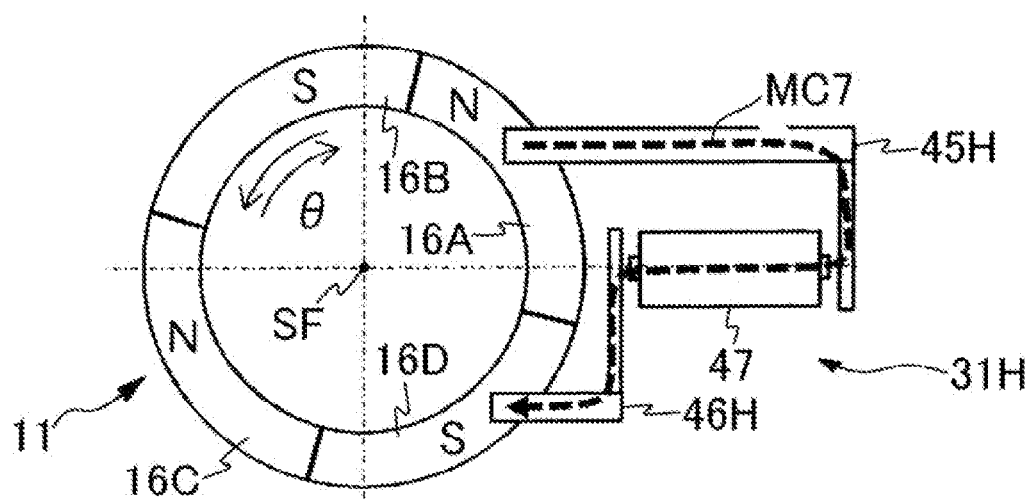
FIG. 8D is a plan view showing a modified embodiment.
Figure 8E:
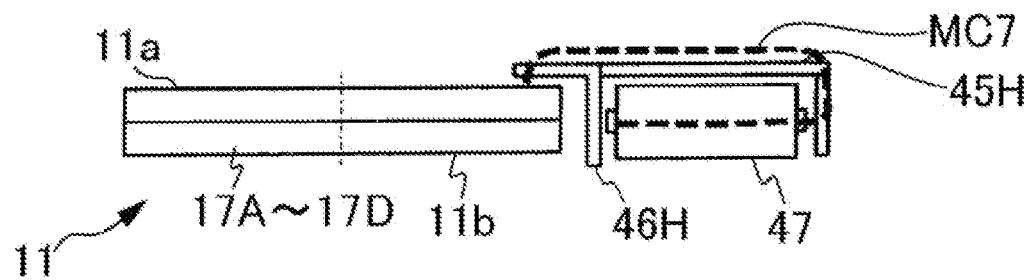
FIG. 8E is a side view of FIG. 8D.

Note that in the present embodiment, like an electric signal generation unit 31H of a modified embodiment shown in FIGS. 8D and 8E, a tip end portion of a first magnetic body 45H on one end-side of the magnetosensitive member 47 may be disposed near a part (for example, the N pole 16A, the S pole 16B or the like) of one polarity on the front surface-side of the magnet 11, and a tip end portion of a second magnetic body 46H on the other end-side of the magnetosensitive member 47 may be disposed near a part (for example, the S pole 16D, the N pole 16A or the like) of different polarity on the front surface-side of the magnet 11. In this case, the first and second magnetic bodies 45H and 46H guide the magnetic field lines from the two parts of the magnet 11 (for example, the N pole 16A and the S pole 16D), which are located at different positions in the θ direction of the magnet 11 and have polarities different from each other, to the length direction of the magnetosensitive member 47. Also in the electric signal generation unit 31H, a magnetic circuit MC7 is formed from the magnet 11 so as to pass the first magnetic body 45H, the magnetosensitive member 47, and the second magnetic body 46H, and the magnetosensitive member 47 can effectively output the stable pulse by the reversal of the AC magnetic field due to the rotation of the magnet 11, without being affected by the unnecessary magnetic field on the side surface of the magnet 11.

Fifth Embodiment

Figure 9A:
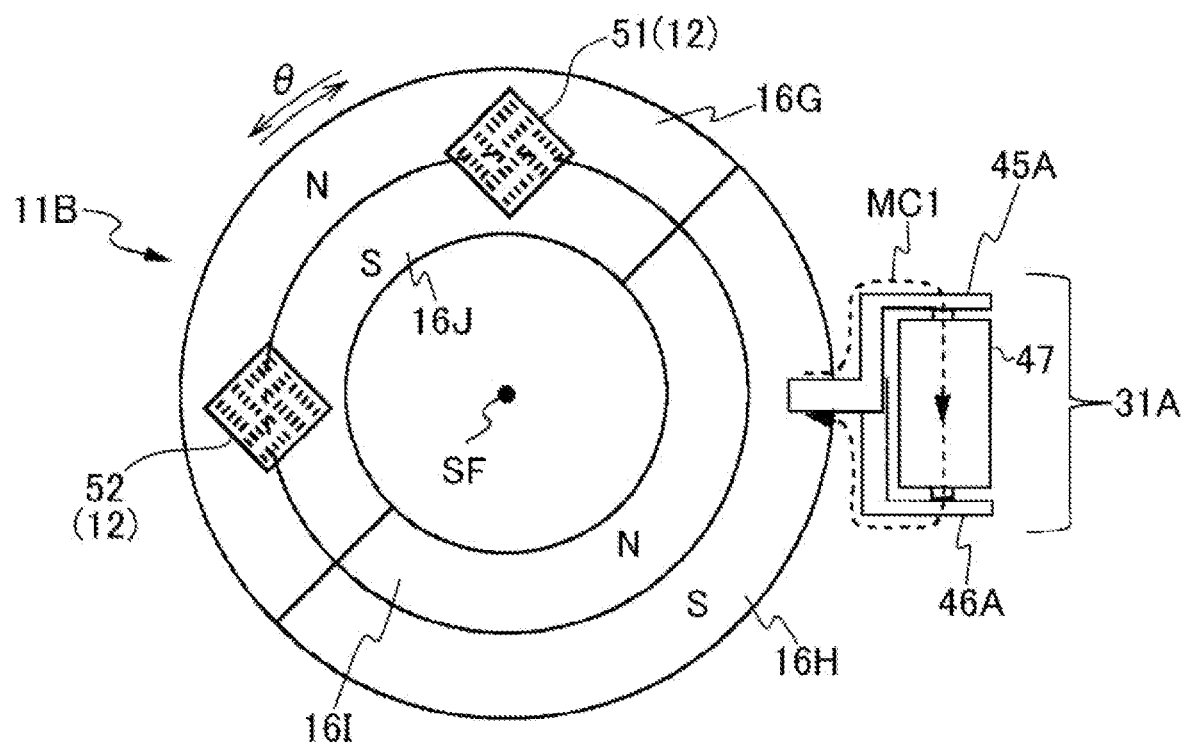
FIG. 9A is a plan view showing a magnet, an electric signal generation unit, and a magnetic sensor in accordance with a fifth embodiment.
Figure 9B:
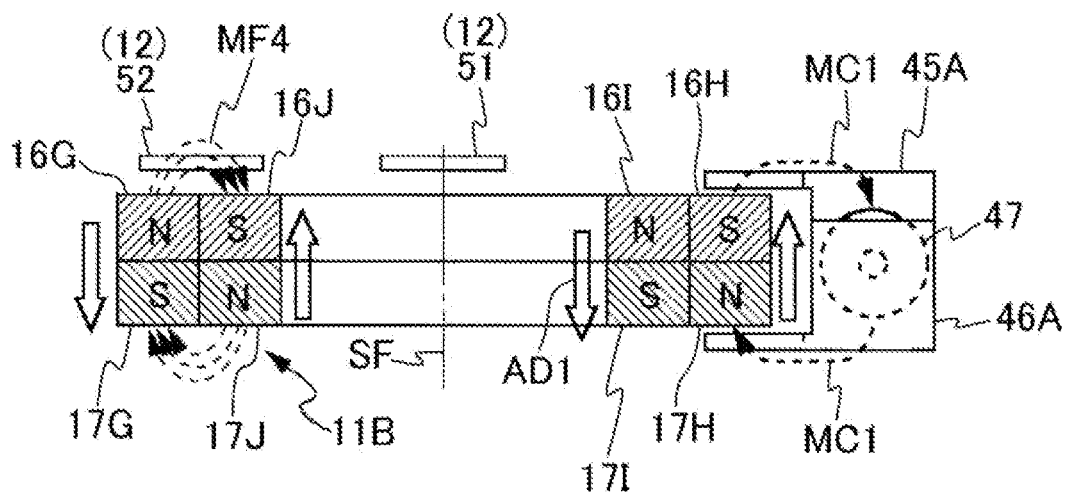
FIG. 9B is a sectional view of FIG. 9A.

A fifth embodiment is described with reference to FIGS. 9A and 9B. Note that in FIGS. 9A and 9B, the parts corresponding to FIGS. 3A to 3C are denoted with the same reference signs, and the detailed descriptions thereof are omitted. FIG. 9A is a plan view showing a magnet 11B, magnetic sensors 51 and 52 (magnetism detection unit 12), and an electric signal generation unit 31A of an encoder device in accordance with the present embodiment, and FIG. 9B is a side view showing the magnet 11B of FIG. 9A, as a sectional view. In FIGS. 9A and 9B, the magnet 11B includes an annular magnet on the outer periphery-side where an N pole 16G and an S pole 16H each having an opening angle of 180° and a fan shape are disposed in the rotating direction (θ direction) of the rotary shaft SF and an annular magnet on the inner periphery-side where an S pole 16J and an N pole 16I each having an opening angle of 180° and a fan shape are disposed in the θ direction. Also, on back surfaces of the N pole 16G and the S pole 16H on the outer periphery-side, an S pole 17G and an N pole 17H having the same shape and different polarity are bonded, and on back surfaces of the N pole 16I and the S pole 16J on the inner periphery-side, an S pole 17I and an N pole 17J having the same shape and different polarity are bonded. As such, phases of the annular magnet on the outer periphery-side of the magnet 11B and the annular magnet on the inner periphery-side are offset by 180°. Also, the magnet 11B has two polarities different from each other in the thickness direction (axial direction AD1). In the magnet 11B, a boundary between the S pole 16J and the N pole 16I on the inner periphery-side substantially matches a boundary between the N pole 16G and the S pole 16H on the outer periphery-side, with respect to the angular position in the θ direction.

In the present embodiment, the magnetosensitive member 47 of the electric signal generation unit 31A is disposed so that the length direction of the magnetosensitive member 47 is parallel to the front surface of the magnet 11B having a flat plate shape and the length direction is parallel to the rotating direction (θ direction) of the rotary shaft SF, in the vicinity of the outer surface of the magnet 11B. Also, the tip end portion of the first magnetic body 45A on one end-side of the magnetosensitive member 47 is disposed near a part of one polarity (for example, the S pole 16H) on the front surface-side of the magnet 11B, and the tip end portion of the second magnetic body 46A on the other end-side of the magnetosensitive member 47 is disposed near a part (for example, the N pole 17H) of the other polarity on the back surface-side of the magnet 11B. In other words, the first and second magnetic bodies 45A and 46A guide the magnetic field lines from the two parts (for example, the S pole 16H and the N pole 17H) of the magnet 11B, which are located at same angular position in the θ direction and have polarities different from each other, to the length direction of the magnetosensitive member 47.

Also, the magnetic sensors 51 and 52 are disposed so as to overlap a boundary part between the annular magnet on the inner periphery-side and the annular magnet on the outer periphery-side, in the vicinity of the front surface of the magnet 11B. An angle between the magnetic sensors 51 and 52 is, for example, about 90°. The other configurations are similar to the first embodiment. In the present embodiment, the magnetization direction of the magnet 11B with respect to the electric signal generation unit 31A is the axial direction AD1, and the magnetization direction with respect to the magnetic sensors 51 and 52 is the radial direction. Also, the length direction of the magnetosensitive member 47 is substantially orthogonal to the axial direction AD1 that is the magnetization direction of the magnet 11B, and is substantially parallel to the θ direction (circumferential direction). Also in the present embodiment, the magnetic circuit MC1 is formed from the magnet 11B so as to pass the first magnetic body 45A, the magnetosensitive member 47, and the second magnetic body 46A. Also, the length direction of the magnetosensitive member 47 is disposed so as to be substantially orthogonal to a tangential direction (herein, parallel to the axial direction AD1) of the magnetic field line, which passes through a substantial center in the length direction of the magnetosensitive member 47, of the magnetic field lines generated on the side surface of the magnet 11B.

A magnetic field component unnecessary for pulse generation in the electric signal generation unit 31A including magnetic field lines generated on the side surface of the magnet 11B is orthogonal to the length direction of the magnetosensitive member 47, and the unnecessary magnetic field component does not adversely affect the generation of the magnetic domain wall from one end toward the other end of the magnetosensitive member 47 caused by the reversal of the AC magnetic field due to the rotation of the magnet 11B. For this reason, even when the magnetosensitive member 47 is disposed near the magnet 11B and the electric signal generation unit 31A is thus made small, it is possible to effectively generate the high-output pulse (electric signal) by using the electric signal generation unit 31A through the reversal of the AC magnetic field in the axial direction AD1 due to the rotation of the magnet 11B, without being affected by the unnecessary magnetic field component. Also, each of the magnetic sensors 51 and 52 can detect a change in magnetic field including a magnetic field line MF4 that is generated between the annular magnet on the inner periphery-side of the magnet 11B and the annular magnet on the outer periphery-side. The encoder device of the present embodiment can obtain the angle and multi-turn information of the rotary shaft SF by using detection results of the magnetic sensors 51 and 52. The other effects are similar to the first embodiment.

Sixth Embodiment

A sixth embodiment is described with reference to FIGS. 10A and 10B. Note that in FIGS. 10A and 10B, the parts corresponding to FIGS. 9A and 9B are denoted with the same reference signs, and the detailed descriptions thereof are omitted.

Figure 10A:
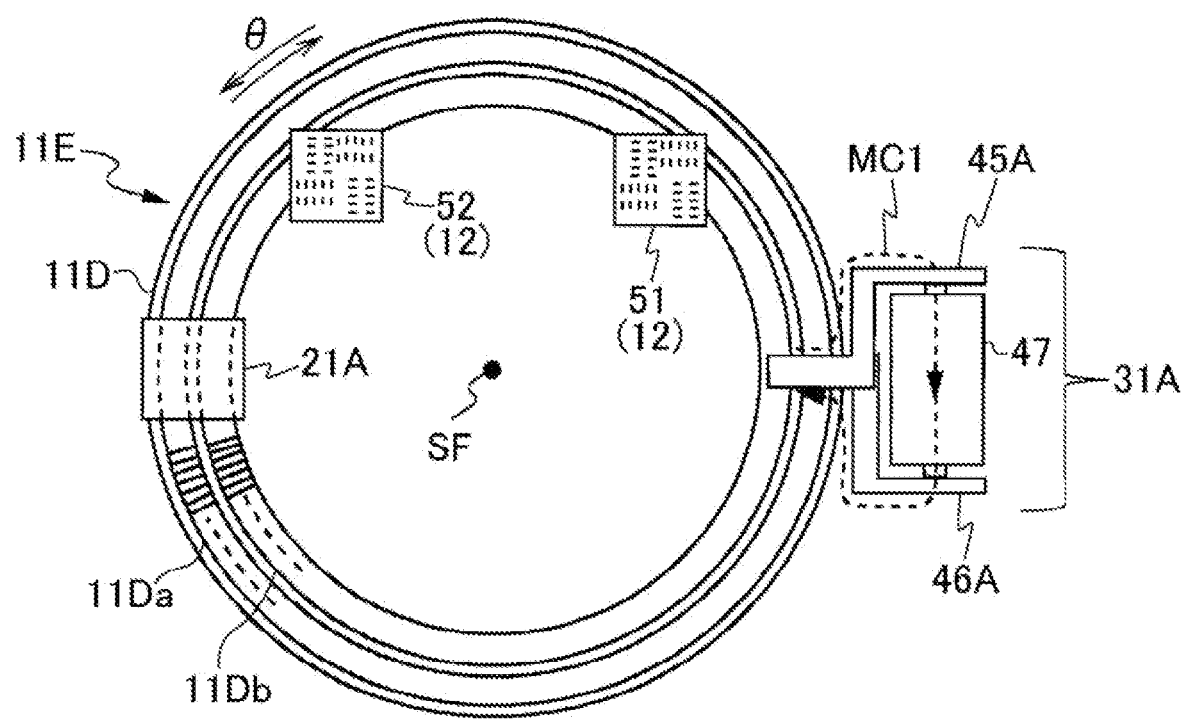
FIG. 10A is a plan view showing an electric signal generation unit, a magnetic sensor and an optical sensor in accordance with a sixth embodiment.
Figure 10B:
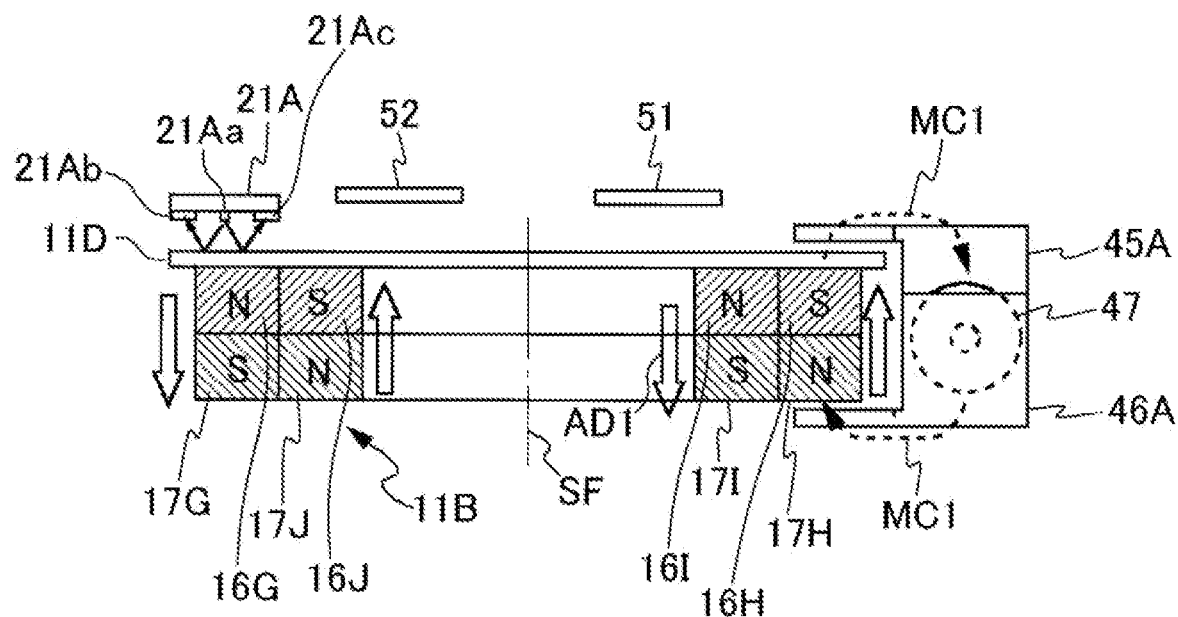
FIG. 10B is a sectional view of FIG. 10A.

FIG. 10A is a plan view showing a rotational disc 11D for optical sensor, magnetic sensors 51 and 52, an optical sensor 21A, and an electric signal generation unit 31A of an encoder device in accordance with the present embodiment, and FIG. 10B is a side view showing a magnet 11B of FIG.

10A, as a sectional view. In FIGS. 10A and 10B, the annular rotational disc 11D (which is actually provided with an opening (not shown) through which the rotary shaft SF passes) is fixed to the front surface of the magnet 11B. The rotational disc 11D and the magnet 11B rotate in the θ direction in conjunction with the rotary shaft SF. An incremental scale 11Da and an absolute scale 11Db are formed concentrically on a front surface of the rotational disc 11D. Also, the rotational disc 11D is disposed between the tip end portion of the first magnetic body 45A of the electric signal generation unit 31A and the front surface of the magnet 11B. The magnetic circuit MC1 of the electric signal generation unit 31A is formed to pass through the rotational disc 11D.

Also, the optical sensor 21A includes a light-emitting element 21Aa that generates illumination light, and light-receiving sensors 21Ab and 21Ac that receive the illumination light generated from the light-emitting element 21Aa and reflected on the incremental scale 11Da and the absolute scale 11Db. The encoder device of the present embodiment can obtain the rotating angle integrated each time the rotary shaft SF rotates by a predetermined angle from a predetermined reference angle, and an absolute angular position within one-turn of the rotary shaft SF by processing detection signals of the light-receiving sensors 21Ab and 21Ac in a detection unit (not shown) similar to the detection unit 23 of FIG. 1. Also, it is possible to obtain the multi-turn information of the rotary shaft SF by performing one counting each time a relative angular position exceeds 360°.

Similarly, the encoder device of the present embodiment can obtain the rotating angle and multi-turn information of the rotary shaft SF by using detection results of the magnetic sensors 51 and 52. Also, a magnetic field component unnecessary for pulse generation in the electric signal generation unit 31A including magnetic field lines generated on the side surface of the magnet 11B is orthogonal to the length direction of the magnetosensitive member 47, and the unnecessary magnetic field component does not adversely affect the generation of the magnetic domain wall from one end toward the other end of the magnetosensitive member 47 caused by the reversal of the AC magnetic field due to the rotation of the magnet 11B. For this reason, even when the magnetosensitive member 47 is disposed near the magnet 11B and the electric signal generation unit 31A is thus made small, it is possible to effectively generate the high-output pulse (electric signal) by using the electric signal generation unit 31A through the reversal of the AC magnetic field in the axial direction AD1 due to the rotation of the magnet 11B, without being affected by the unnecessary magnetic field component. The other effects are similar to the first embodiment.

Note that when the plurality of electric signal generation units is provided, like the embodiments and modified embodiments, the electric power that is output from the electric signal generation unit 31A may also be used as a detection signal for detecting the multi-turn information or may be used for supply to a detection system and the like. Note that in the first embodiment, the magnet 11 is an eight-pole magnet having four poles in the circumferential direction and two poles in the thickness direction. However, the present invention is not limited thereto, and can be changed as appropriate. For example, the number of poles of the magnet 11 in the circumferential direction may be two or four or more.

Note that in the above embodiments, the position detection system 1 detects the rotational position information of the rotary shaft SF (moving part), as the position information but may also detect at least one of a position in a predetermined direction, a speed and an acceleration, as the position information. The encoder device EC may comprises a rotary encoder or a linear encoder. Also, the encoder device EC may have a configuration where the electric power generation part and the detection unit are provided on the rotary shaft SF and the magnet 11 is provided outside the moving body (for example, the rotary shaft SF), so that the relative positions of the magnet and the detection unit are changed with movement of the moving part. Also, the position detection system 1 may not detect the multi-turn information of the rotary shaft SF, and may detect the multi-turn information by an external processing unit of the position detection system 1.

In the above embodiments, the electric signal generation units 31A and 31B generate the electric power (electric signal) when a predetermined positional relation with the magnet 11 is satisfied. The position detection system 1 may also detect (count) the position information (for example, the rotational position information including the multi-turn information or the angular position information) of the moving part (for example, the rotary shaft SF) by using, as the detection signal, the change in electric power (signal) generated from the electric signal generation units 31A and 31B. For example, the electric signal generation units 31A and 31B may be used as sensors (position sensors), and the position detection system 1 may detect the position information of the moving part by the electric signal generation units 31A and 31B and one or more sensors (for example, the magnetic sensor and the light-receiving sensor). Also, when the number of the electric signal generation units is two or more, the position detection system 1 may detect the position information by using the two or more electric signal generation units, as sensors. For example, the position detection system 1 may detect the position information of the moving part by using the two or more electric signal generation units, as sensors, without using the magnetic sensors, or may detect the position information of the moving part without using the light-receiving sensor. Also, similarly to the magnetic sensor, the position detection system 1 may determine the rotating direction of the rotary shaft SF by using the two or more electric signal generation units, as sensors, based on two or more electric signals.

Also, the electric signal generation units 31A and 31B may supply at least a part of electric power that is consumed in the position detection system 1. For example, the electric signal generation units 31A and 31B may supply the electric power to a processing unit of the position detection system 1, which has relatively small power consumption. Also, the electric power supply system 2 may not supply the electric power to some of the position detection system 1. For example, the electric power supplying system 2 may intermittently supply the electric power to the detection unit 13 and may not supply the electric power to the storage unit 14. In this case, the electric power may be supplied intermittently or continuously to the storage unit 14 from a power supply, a battery and the like provided outside the electric power supplying system 2. The electric power generation part may generate the electric power by a phenomenon other than the large Barkhausen jump, and for example, may not supply the electric power to the moving part (for example, the rotary shaft SF) and some of the position detection system 1. For example, the electric power supplying system 2 may intermittently supply the electric power to the detection unit 13 and may not supply the electric power to the storage unit 14. In this case, the electric power may be supplied intermittently or continuously to the storage unit 14 from a power supply, a battery and the like provided outside the electric power supplying system 2. The electric power generation part may generate the electric power by a phenomenon other than the large Barkhausen jump, and for example, may generate the electric power by electromagnetic induction associated with the change in magnetic field due to movement of the moving part (for example, the rotary shaft SF). The storage unit in which the detection result of the detection unit is stored may be provided outside the position detection system 1 or may be provided outside the encoder device EC.

[Drive Device]

Figure 11:
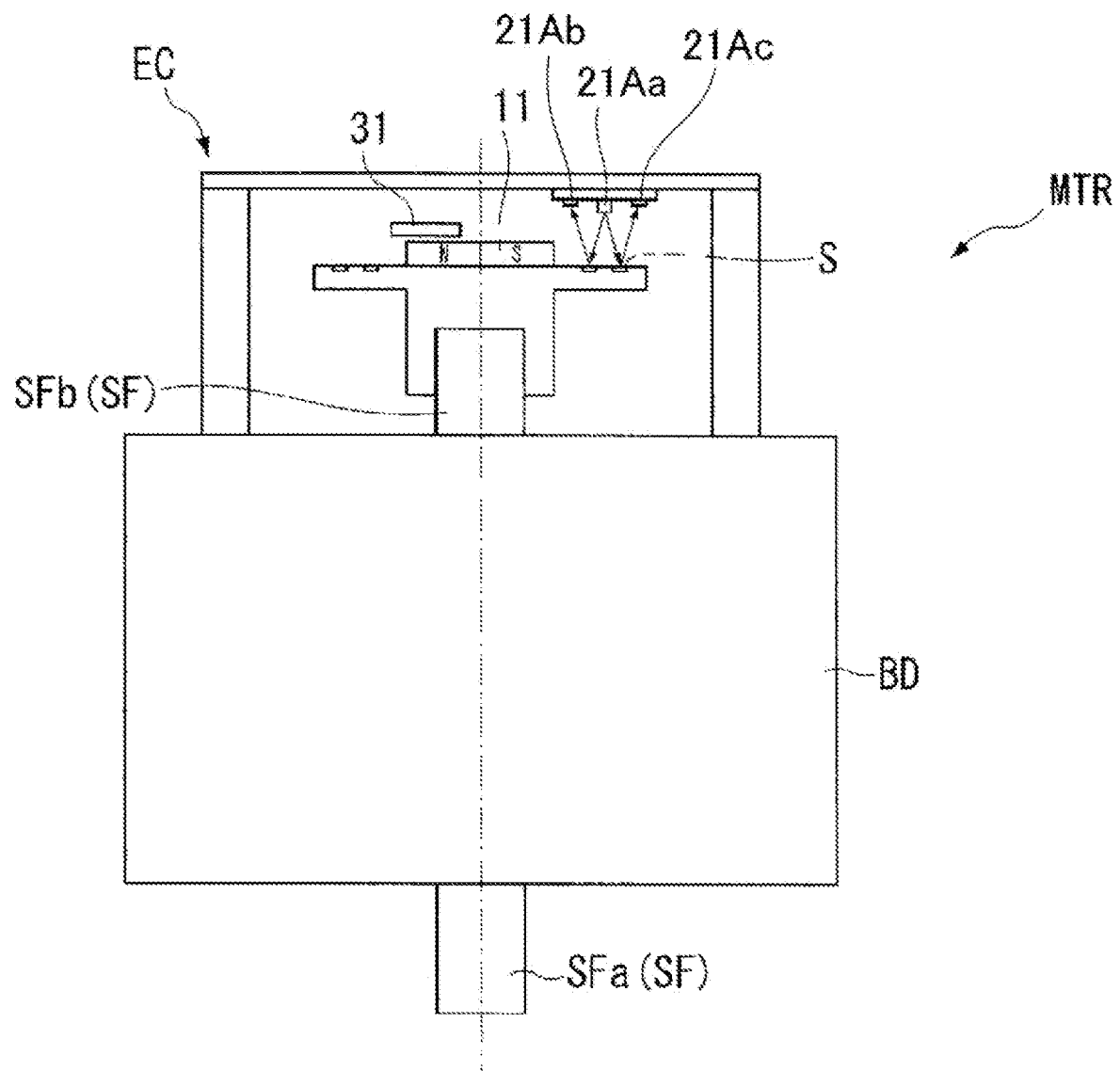
FIG. 11 shows an example of a drive device.

An example of the drive device is described. FIG. 11 shows an example of a drive device MTR. In descriptions below, the constitutional parts that are the same as or equivalent to the above embodiments are denoted with the same reference signs for omitting or simplifying the descriptions. The drive device MTR is a motor device including an electric motor. The drive device MTR comprises the rotary shaft SF, a main body part (drive part) BD that rotates the rotary shaft SF, and the encoder device EC that detects the rotational position information of the rotary shaft SF.

The rotary shaft SF has a load-side end portion SFa, and an anti-load-side end portion SFb. The load-side end portion SFa is connected to another power transmission mechanism such as a decelerator. A scale S is fixed to the anti-load-side end portion SFb via a fixing part. The scale S is fixed, and the encoder device EC is attached. The encoder device EC is an encoder device in accordance with the embodiments, the modified embodiments or combinations thereof.

In the drive device MTR, the motor control unit MC shown in FIG. 1 controls the main body part BD by using a detection result of the encoder device EC. Since the replacement of the battery of the encoder device EC is not required or is less required, the drive device MTR can reduce the maintenance cost. Note that the drive device MTR is not limited to the motor device, and may also be another drive device having a shaft part that rotates by using a hydraulic pressure or pneumatic pressure.

[Stage Device]

Figure 12:
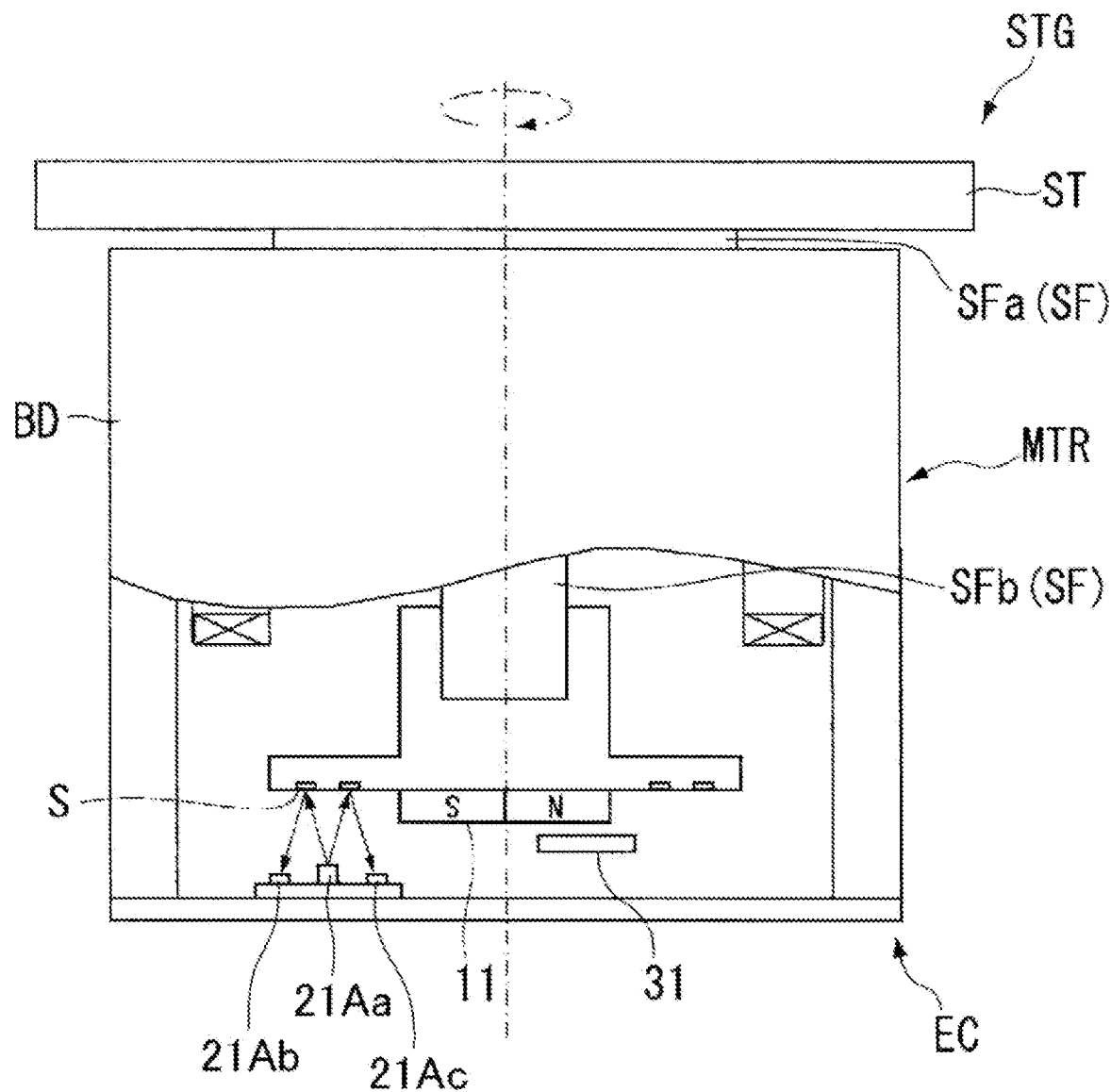
FIG. 12 shows an example of a stage device.

An example of a stage device is described. FIG. 12 shows a stage device STG. The stage device STG has such a configuration that a rotational table (moving object) TB is attached to the load-side end portion SFa of the rotary shaft SF of the drive device MTR shown in FIG. 11. In descriptions below, the constitutional parts that are the same as or equivalent to the above embodiments are denoted with the same reference signs for omitting or simplifying the descriptions.

In the stage device STG, when the drive device MTR is driven to rotate the rotary shaft SF, the rotation is transmitted to the rotational table TB. At this time, the encoder device EC detects the angular position of the rotary shaft SF, and the like. Therefore, it is possible to detect an angular position of the rotational table TB by using an output from the encoder device EC. Note that a decelerator and the like may be disposed between the load-side end portion SFa of the drive device MTR and the rotational table TB. Since the replacement of the battery of the encoder device EC is not required or is less required, the stage device STG can reduce the maintenance cost. Note that the stage device STG can be applied to a rotational table provided in a machine tool such as a lathe, for example.

[Robot Device]

Figure 13:
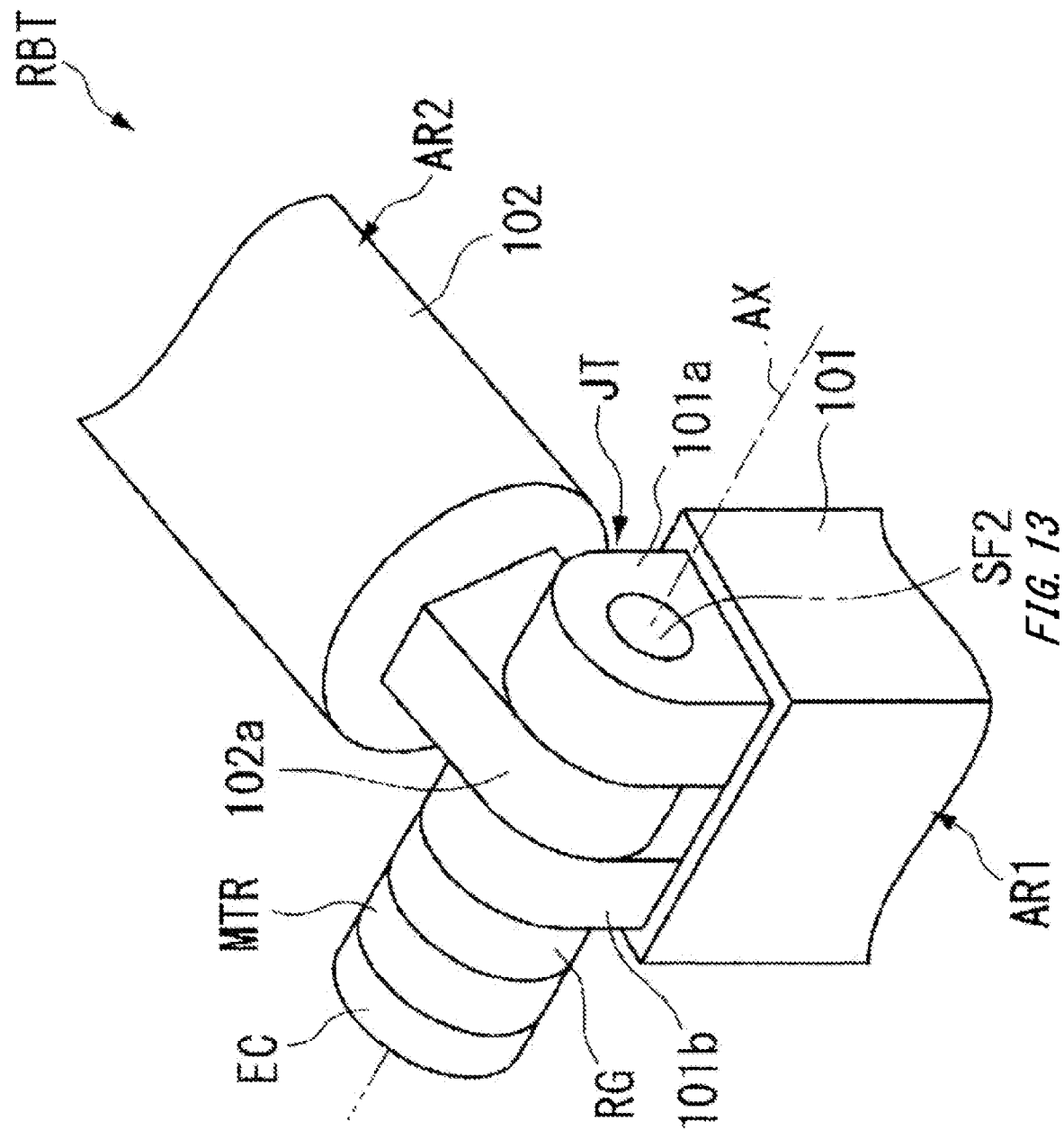
FIG. 13 shows an example of a robot device.

An example of a robot device is described. FIG. 13 is a perspective view showing a robot device RBT. Note that FIG. 13 pictorially shows a part (joint part) of the robot device RBT. In descriptions below, the constitutional parts that are the same as or equivalent to the above embodiments are denoted with the same reference signs for omitting or simplifying the descriptions. The robot device RBT comprises a first arm AR1, a second arm AR2, and a joint part JT. The first arm AR1 is connected to the second arm AR2 via the joint part JT.

The first arm AR1 includes an arm part 101, a bearing 101a, and a bearing 101b. The second arm AR2 includes an arm part 102 and a connection part 102a. The connection part 102a is disposed between the bearing 101a and the bearing 101b at the joint part JT. The connection part 102a is provided integrally with the rotary shaft SF2. The rotary shaft SF2 is inserted into both the bearing 101a and the bearing 101b at the joint part JT. An end portion on a side of the rotary shaft SF2, which is inserted into the bearing 101b, is connected to a decelerator RG through the bearing 101b.

The decelerator RG is connected to the drive device MTR, and decelerates rotation of the drive device MTR to 1/100 or the like, for example, and transmits the same to the rotary shaft SF2. Although not shown and described in FIG. 13, the load-side end portion SFa of the rotary shaft SF of the drive device MTR is connected to the decelerator RG. Also, the scale S of the encoder device EC is attached to the anti-load-side end portion SFb of the rotary shaft SF of the drive device MTR.

In the robot device RBT, when the drive device MTR is driven to rotate the rotary shaft SF, the rotation is transmitted to the rotary shaft SF2 via the decelerator RG. The connection part 102a is integrally rotated by the rotation of the rotary shaft SF2, so that the second arm AR2 rotates with respect to the first arm AR1. At this time, the encoder device EC detects an angular position of the rotary shaft SF, and the like. Therefore, it is possible to detect an angular position of the second arm AR2 by using an output from the encoder device EC.

Since the replacement of the battery of the encoder device EC is not required or is less required, the robot device RBT can reduce the maintenance cost. Note that the robot device RBT is not limited to the above configuration, and the drive device MTR can be applied to a variety of robot devices having a joint.

What is claimed is:

1. An encoder device comprising:
   a position detection unit for detecting rotational position information of a rotary shaft configured to rotate around a first axis as a center;
   a magnet configured to rotate around the first axis as the center in conjunction with the rotary shaft and provided with two kinds of polarities alternating along a circumferential direction of a rotation with the first axis as the center; and
   an electric signal generation unit for generating an electric signal based on a magnetic characteristic of a magnetosensitive part, wherein
   the electric signal generation unit includes:
      the magnetosensitive part in which the magnetic characteristic changes by a change in magnetic field caused by the rotation of the magnet;
      a first magnetic body, wherein a first end of the first magnetic body is positioned near the magnet in a direction parallel to the first axis, and a second end of the first magnetic body is connected to a first end of the magnetosensitive part; and
      a second magnetic body, wherein a first end of the second magnetic body is positioned near the magnet in the direction parallel to the first axis, and a second end of the second magnetic body is connected to a second end of the magnetosensitive part, and the magnetosensitive part is disposed along a plane that is orthogonal to the first axis and spaced apart from the magnet in a radial direction of the rotation around the first axis as the center.

2. The encoder device according to claim 1, wherein a polarity of the magnet near which the first end of the first magnetic body is positioned and a polarity of the magnet near which the first end of the second magnetic body is positioned are different from each other.

3. The encoder device according to claim 1, wherein the first magnetic body and the second magnetic body guide a magnetic field line of the magnet in a length direction of the magnetosensitive part.

4. The encoder device according to claim 1, wherein the magnet has polarities different from each other also in a thickness direction orthogonal to the circumferential direction.

5. The encoder device according to claim 4, wherein the first magnetic body and the second magnetic body guide magnetic field lines from two parts of the magnet, which are located at the same position in the circumferential direction and have polarities different from each other, to a length direction of the magnetosensitive part.

6. The encoder device according to claim 4, wherein the first magnetic body and the second magnetic body guide magnetic field lines from two parts of the magnet, which are located at different positions in the circumferential direction and have polarities different from each other, to a length direction of the magnetosensitive part.

7. The encoder device according to claim 1, wherein the magnetosensitive part generates large Barkhausen jump by the change in the magnetic field associated with a rotation of the magnet.

8. The encoder device according to claim 1, wherein the electric signal generation unit generates pulsed electric power by a rotation of the rotary shaft.

9. The encoder device according to claim 1, further comprising
a battery for supplying at least a part of electric power that is consumed in the position detection unit in accordance with the electric signal generated by the electric signal generation unit.

10. The encoder device according to claim 9, further comprising
a switching unit for switching whether to supply electric power from the battery to the position detection unit in accordance with the electric signal generated by the electric signal generation unit.

11. The encoder device according to claim 9, wherein the battery includes a primary battery or a secondary battery.

12. The encoder device according to claim 9, wherein the position detection unit (i) includes a magnet for detecting positions and a magnetism detection unit, mutual relative positions of the magnet for detecting positions and the magnetism detection unit being changed by a rotation of the rotary shaft, and (ii) detects the rotational position information based on a magnetic field formed by the magnet for detecting positions, and the magnetism detection unit detects the magnetic field formed by the magnet for detecting positions by using electric power supplied from the battery.

13. The encoder device according to claim 12, wherein the magnet that causes the change in the magnetic field for the electric signal generation unit to generate the electric signal also serves as the magnet for detecting positions.

14. The encoder device according to claim 1, wherein the position detection unit includes:
a scale that rotates in conjunction with the rotary shaft;
an irradiation unit for irradiating the scale with light; and
a light detection unit for detecting light from the scale.

15. The encoder device according to claim 1, wherein the magnet has a ring shape, and
the magnetosensitive part is disposed outside of an outer surface of the magnet or inside of an inner surface of the magnet.

16. The encoder device according to claim 1, wherein the position detection unit includes:
an angle detection unit for detecting angular position information within one-turn of the rotary shaft; and
a multi-turn information detection unit for detecting, as the rotational position information, multi-turn information of the rotary shaft.

17. A drive device comprising:
the encoder device according to claim 1; and
a power supplying unit for supplying power to the rotary shaft.

18. A stage device comprising:
a moving object; and
the drive device according to claim 17 for moving the moving object.

19. A robot device comprising:
the drive device according to claim 18; and
an arm configured to be relatively moved by the drive device.

* * * * *